United States Patent
Inoue et al.

(10) Patent No.: US 6,694,772 B2
(45) Date of Patent: Feb. 24, 2004

(54) ABSORPTION CHILLER-HEATER AND GENERATOR FOR USE IN SUCH ABSORPTION CHILLER-HEATER

(75) Inventors: Naoyuki Inoue, Toyko (JP); Tetsuya Endo, Toyko (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/211,288

(22) Filed: Aug. 5, 2002

(65) Prior Publication Data

US 2003/0029188 A1 Feb. 13, 2003

(30) Foreign Application Priority Data

Aug. 9, 2001  (JP) .................................. 2001-242285
Jan. 30, 2002 (JP) .................................. 2002-022086
Jan. 30, 2002 (JP) .................................. 2002-022087

(51) Int. Cl.$^7$ ................................................ F25B 33/00
(52) U.S. Cl. .................................. 62/497; 62/476
(58) Field of Search ........................ 62/476, 497, 101, 62/109, 485

(56) References Cited

U.S. PATENT DOCUMENTS

| | | | | |
|---|---|---|---|---|
| 3,796,045 A | * | 3/1974 | Foster-Pegg | 60/39.02 |
| 4,009,575 A | * | 3/1977 | Hartman, Jr. et al. | 60/648 |
| 5,600,967 A | * | 2/1997 | Meckler | 62/476 |
| 5,766,519 A | * | 6/1998 | Erickson | 261/140.2 |
| 5,964,103 A | * | 10/1999 | Mabuchi et al. | 62/476 |
| 6,460,338 B1 | * | 10/2002 | Katayama et al. | 60/651 |

FOREIGN PATENT DOCUMENTS

| | | |
|---|---|---|
| JP | 57-148673 | 9/1982 |
| JP | 11-248291 | 9/1999 |

* cited by examiner

Primary Examiner—Melvin Jones
(74) Attorney, Agent, or Firm—Westerman, Hattori, Daniels & Adrian, LLP

(57) ABSTRACT

An absorption chiller-heater is driven by a high-temperature exhaust gas discharged from an external apparatus such as a gas turbine. The absorption chiller-heater includes an exhaust gas path for introducing a high-temperature exhaust gas serving as a heat source into the high-temperature generator, and then the exhaust heat recovery generator. The high-temperature generator and the exhaust heat recovery generator comprise a vertical heat transfer tube bank for allowing the high-temperature exhaust gas to pass therethrough, a gas-liquid separation chamber is provided above the vertical heat transfer tube bank so as to cover opening portions of the vertical heat transfer tube bank, and a solution supply chamber is provided below the vertical heat transfer tube bank so as to cover opening portions of the vertical heat transfer tube bank.

16 Claims, 15 Drawing Sheets

ABSORPTION CHILLER-HEATER AND GENERATOR FOR USE IN SUCH ABSORPTION CHILLER-HEATER

BACKGROUND OF THE INVENTION

1. Field of the Invention

The present invention relates to an absorption chiller-heater and a generator for use in such absorption chiller-heater, and more particularly to an absorption chiller-heater which is driven by an exhaust gas and can effectively utilize a high-temperature exhaust gas discharged from an external apparatus such as a gas turbine to increase exhaust heat utilization efficiency, and to a generator for use in such absorption chiller-heater.

2. Description of the Related Art

There has been known a cogeneration system which performs a cooling operation, a heating operation, and a hot-water supply operation using a high-temperature exhaust gas discharged from an external apparatus such as a gas turbine. In the cogeneration system which incorporates a gas turbine having a small capacity, cases where a hot-water supply operation, a cooling operation, and a heating operation are performed by recovering heat from a high-temperature exhaust gas are increasing. For example, in the cogeneration system which incorporates a micro-gas turbine of the 20 to 100 kW class, heat is recovered from an exhaust gas discharged from the micro-gas turbine and having a temperature of about 200 to 300° C. for thereby performing a hot-water supply operation, a cooling operation, and a heating operation. In this case, the high-temperature exhaust gas discharged from the gas turbine is supplied to an exhaust-gas boiler to produce hot water for thereby performing a hot-water supply operation and a heating operation, or to produce hot water for thereby performing a cooling operation by an absorption chiller which uses the produced hot water as a heat source.

However, in the cogeneration system which utilizes such hot water, the apparatus structure is complicated, a thermal efficiency of the absorption chiller-heater is low, and a problem of operational characteristics arises.

SUMMARY OF THE INVENTION

The present invention has been made in view of the above drawbacks in the prior art, and it is therefore a first object of the present invention to provide an absorption chiller-heater which is driven by an exhaust gas, can effectively utilize a high-temperature exhaust gas by a simple apparatus structure, and has a high thermal efficiency.

A second object of the present invention is to provide a generator for use in such absorption chiller-heater which can reduce the amount of absorption solution to be reserved by a simple apparatus structure, is free from local superheat and has a high reliability with a compact structure, and can effectively utilize a gas serving as a heat source (heat source gas) by causing the heat source gas and the absorption solution to flow in a countercurrent flow by a simple apparatus structure.

In order to achieve the first object, according to a first aspect of the present invention, there is provided an absorption chiller-heater comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator, the exhaust gas path being substantially straight in a flow direction of the exhaust gas; wherein the high-temperature generator and the exhaust heat recovery generator comprise a vertical heat transfer tube bank for allowing the high-temperature exhaust gas to flow therethrough, a gas-liquid separation chamber is provided above the vertical heat transfer tube bank so as to cover opening portions of the vertical heat transfer tube bank, a solution supply chamber is provided below the vertical heat transfer tube bank so as to cover opening portions of the vertical heat transfer tube bank, and the high-temperature exhaust gas is led to the vertical heat transfer tube bank of the high-temperature generator, and then the vertical heat transfer tube bank of the exhaust heat recovery generator.

The exhaust gas path may comprise an upper tube plate and a lower tube plate for the vertical heat transfer tube bank, and both side plates, and have a rectangular cross section for thereby achieving a desired simple structure.

Further, a heat exchanger for recovering heat from the exhaust gas may be provided between the high-temperature generator and the exhaust heat recovery generator in the exhaust gas path, and/or downstream of the exhaust heat recovery generator in a flow direction of the exhaust gas. Thus, the solution to be introduced into the high-temperature generator can be preheated to utilize the exhaust gas more effectively. The heat exchanger for recovering heat from the exhaust gas may comprise a horizontal heat transfer tube bank provided in the exhaust gas path having a rectangular cross section.

Further, a downcomer may be provided between the gas-liquid separation chamber and the solution supply chamber in the high-temperature generator and the exhaust heat recovery generator to circulate the solution smoothly.

In order to achieve the second object, according to a second aspect of the present invention, there is provided a generator for use in an absorption chiller-heater, comprising: an upper tube plate; a lower tube plate; a vertical heat transfer tube bank provided between the upper tube plate and the lower tube plate, the vertical heat transfer tube bank comprising a plurality of heat transfer tubes for allowing absorption solution to flow therethrough, and a gas serving as a heat source flowing outside of the heat transfer tubes; and a plurality of downcomers provided between the upper tube plate and the lower tube plate for allowing the absorption solution to flow therethrough downwardly.

By providing the downcomers, the solution can be circulated smoothly between the gas-liquid separation chamber and the solution supply chamber to improve heat transfer and prevent local superheat. Further, the downcomer may be provided in the same manner as the vertical heat transfer tube bank, i.e. may be provided in the vertical heat transfer tube bank and between the tube plates, thus making an apparatus structure compact and increasing a reliability of the apparatus.

In the case where the downcomer is provided in the heat transfer tube bank, the downcomer may be thermally isolated from the exhaust gas, or may comprise a double tube so that a downcomer portion does not contact the exhaust gas directly.

The solution reserving section may be composed mainly of the interior of the vertical heat transfer tube bank, the solution supply chamber and the gas-liquid separation chamber, and hence may be reduced extremely.

In order to achieve the second object, according to a third aspect of the present invention, there is provided a generator for use in an absorption chiller-heater, comprising: an upper tube plate; a lower tube plate; a vertical heat transfer tube bank provided between the upper tube plate and the lower tube plate, the vertical heat transfer tube bank comprising a plurality of heat transfer tubes for allowing absorption solution to flow therethrough, and a gas serving as a heat source flowing outside of the heat transfer tubes; a gas-liquid separation chamber provided above the upper tube plate so as to cover opening portions of the vertical heat transfer tube bank; a solution supply chamber provided below the lower tube plate so as to cover opening portions of the vertical heat transfer tube bank; at least one baffle plate provided in each of the gas-liquid separation chamber and the solution supply chamber for dividing the vertical heat transfer tube bank into a plurality of blocks in a flow direction of the gas; an absorption solution inlet for supplying the absorption solution to one of the gas-liquid separation chamber and the solution supply chamber, the absorption solution inlet being provided at an outlet side of the gas; and an absorption solution outlet for discharging the absorption solution from the gas-liquid separation chamber, the absorption solution outlet being provided at an inlet side of the gas.

By combination of the block structure formed by the baffle plate and the downcomer, the solution can be smoothly circulated up and down and the whole flow of the solution can be regulated. Further, the solution and the exhaust gas flow in a countercurrent flow to increase the temperature difference for heat transfer, thus utilizing the exhaust gas effectively.

In order to achieve the second object, according to a fourth aspect of the present invention, there is provided a generator for use in an absorption chiller-heater, comprising: an upper tube plate; a lower tube plate; a vertical heat transfer tube bank provided between the upper tube plate and the lower tube plate, the vertical heat transfer tube bank comprising a plurality of heat transfer tubes for allowing absorption solution to flow therethrough, and a gas serving as a heat source flowing outside of the heat transfer tubes; wherein the upper tube plate comprises an integral component, and an upper chamber is provided above the upper tube plate so as to cover the upper tube plate; the lower tube plate comprises an integral component, and a lower chamber is provided below the lower tube plate so as to cover the lower tube plate; both sides of the vertical heat transfer tube bank are covered by flat plates which connect the upper chamber and the lower chamber; and the upper tube plate, the lower tube plate and the flat plates define a gas flow path for allowing the gas to flow therethrough.

According to the present invention, there is no liquid-cooled wall at both sides, and the solution reserving section is composed mainly of the interior of the vertical heat transfer tube bank, the upper chamber and the lower chamber, and hence the amount of the solution to be reserved can be reduced extremely. In the generator according to the fourth aspect of the present invention, a downcomer may be provided to connect the upper chamber and the lower chamber. Further, a baffle plate for regulating the flow of the solution may be provided to allow the gas and the solution to flow in a countercurrent flow.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 3A is a cross-sectional view taken along a flow direction of an exhaust gas, and FIG. 3B is a cross-sectional view taken along a direction perpendicular to the flow direction of the exhaust gas;

FIG. 4A is a cross-sectional view taken along a flow direction of an exhaust gas, FIG. 4B is a cross-sectional view taken along a direction perpendicular to the flow direction of the exhaust gas, and FIG. 4C is a cross-sectional view taken along line IV—IV of FIG. 4A;

FIG. 7A is a cross-sectional view taken along a flow direction of an exhaust gas, FIG. 7B is a cross-sectional view taken along a direction perpendicular to the flow direction of the exhaust gas, and FIG. 7C is a view as viewed from line VII—VII of FIG. 7A;

FIG. 8A is a sectional view showing a whole structure of a downcomer and FIG. 8B is a view as viewed from line VIII—VIII of FIG. 8A;

FIG. 9A is a cross-sectional view taken along a flow direction of an exhaust gas, FIG. 9B is a cross-sectional view taken along a direction perpendicular to the flow direction of the exhaust gas, and FIG. 9C is a view as viewed from line IX—IX of FIG. 9A;

FIG. 13A is a cross-sectional view taken along a flow direction of an exhaust gas, FIG. 13B is a cross-sectional view taken along a direction perpendicular to the flow direction of the exhaust gas, and FIG. 13C is a view as viewed from line XIII—XIII of FIG. 13A;

FIG. 14A is a cross-sectional view taken along a flow direction of an exhaust gas and FIG. 14B is a cross-sectional view taken along a direction perpendicular to the flow direction of the exhaust gas.

DETAILED DESCRIPTION OF THE PREFERRED EMBODIMENTS

An absorption chiller-heater and a generator for use in such absorption chiller-heater according to embodiments of the present invention will be described below with reference to drawings.

In an absorption chiller-heater which utilizes a high-temperature exhaust gas, in order to increase the quantity of heat of an exhaust gas utilized as a heat source of a generator and increase a thermal efficiency, according to the present invention, a high-temperature generator and an exhaust heat recovery generator are provided in series at a two-stage, and a vertical heat transfer tube bank is provided in the respective generators to construct an exhaust gas path for allowing the exhaust gas to pass therethrough.

Next, an absorption chiller-heater according to embodiments of a first aspect of the present invention will be described in detail with reference to FIGS. 1A and 2A.

As working medium of the absorption chiller-heater, water is generally used as refrigerant, and an aqueous solution of inorganic salts such as an aqueous solution of lithium bromide is generally used as absorption solution. In the following embodiments, the same working medium is used.

Figure 1A:
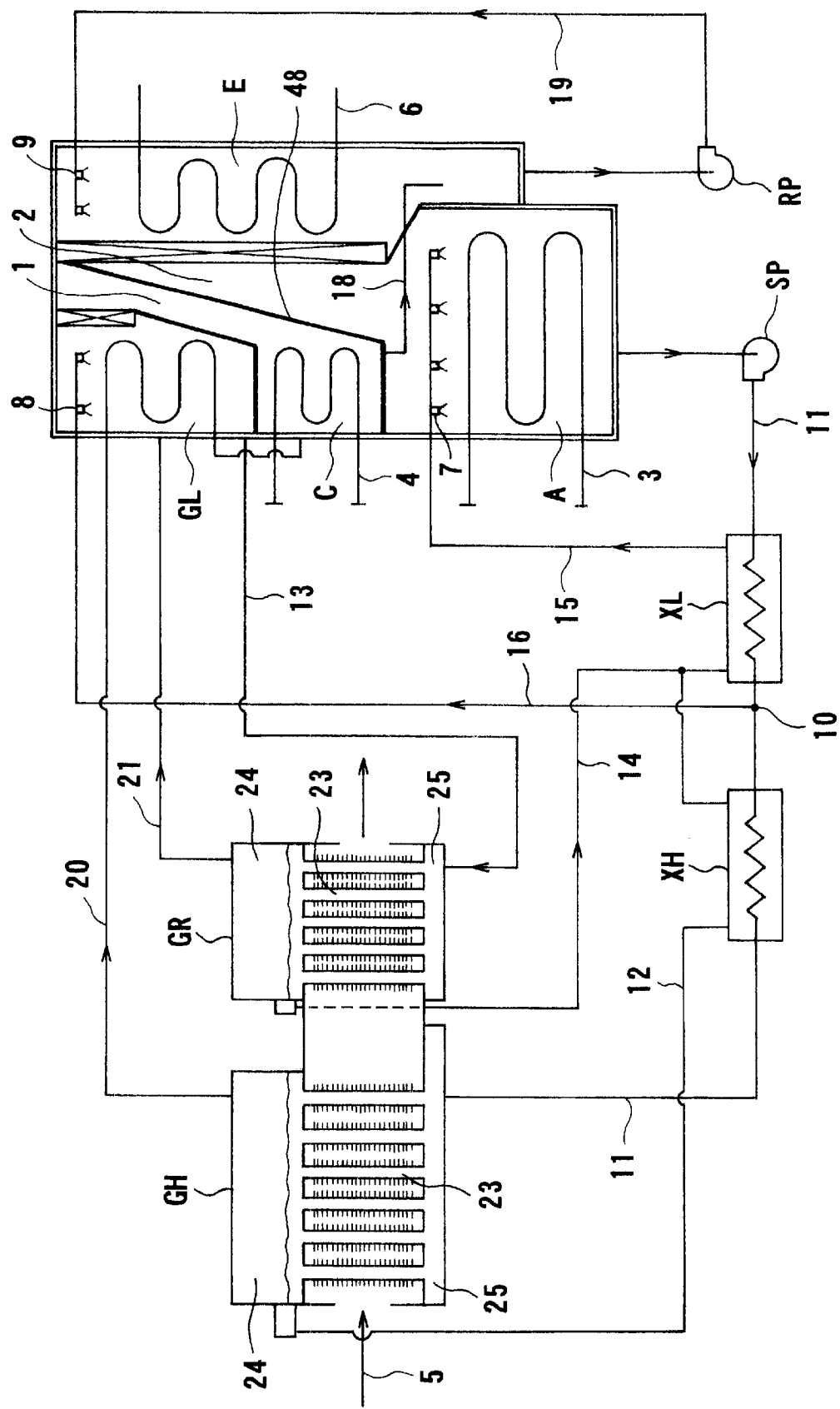
FIG. 1A is a schematic circuit diagram of an absorption chiller-heater according to an embodiment of a first aspect of the present invention.
Figure 2A:
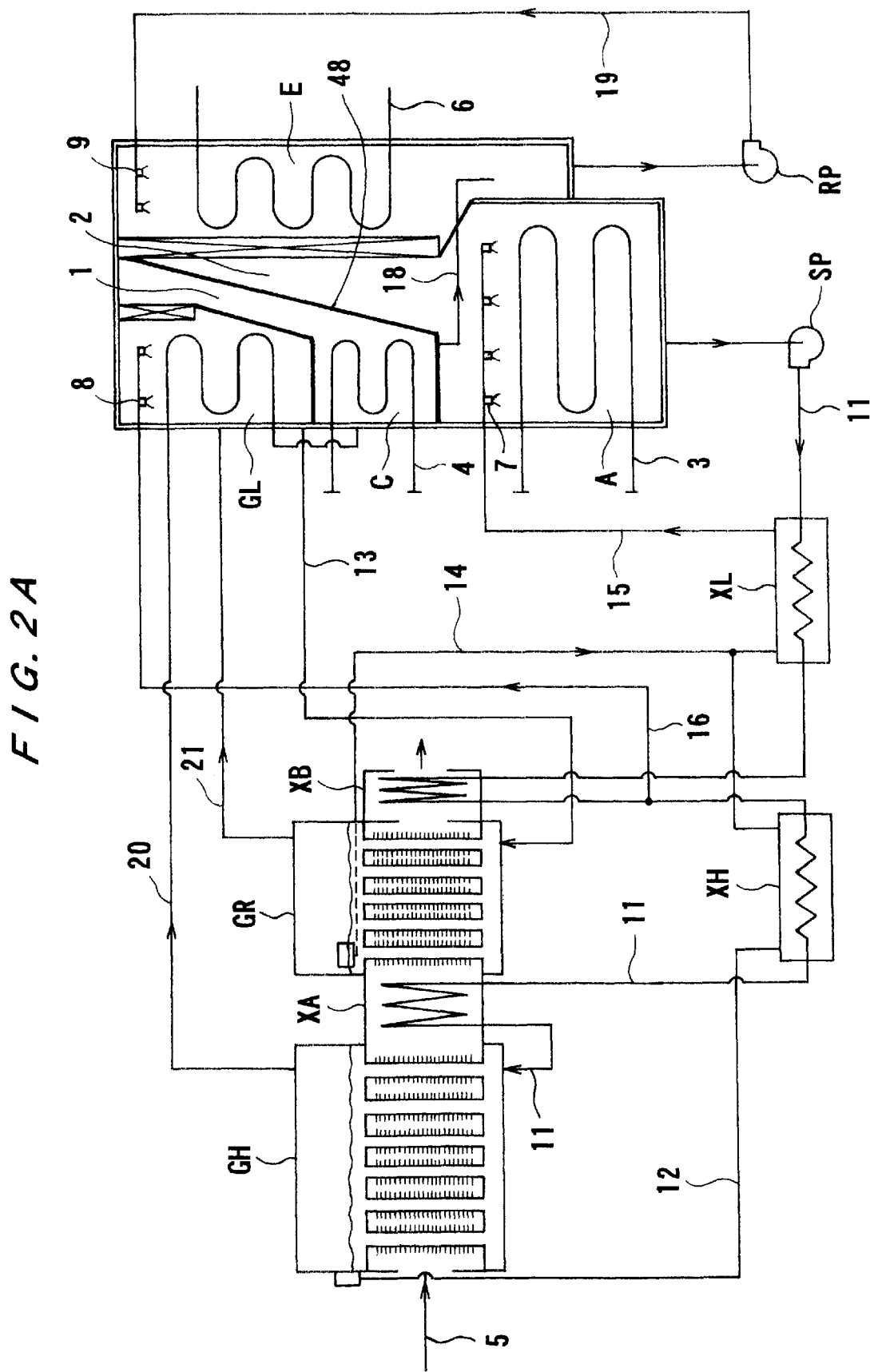
FIG. 2A is a schematic circuit diagram of an absorption chiller-heater according to another embodiment of the first aspect of the present invention.

In the absorption chiller-heater shown in FIGS. 1A and 2A, there are provided an absorber A, a low-temperature generator GL, a high-temperature generator GH, an exhaust heat recovery generator GR, a condenser C, an evaporator E, a low-temperature heat exchanger XL, a high-temperature heat exchanger XH, and exhaust heat recovery heat exchangers XA and XB. Further, in the absorption chiller-heater, there are provided a solution pump SP, and a refrigerant pump RP.

In FIGS. 1A and 2A, reference numerals 1 and 2 represent refrigerant vapor passage, reference numerals 3 and 4 represent cooling water passages, reference numeral 5 represents a high-temperature exhaust gas, and reference numeral 6 represents a cold or hot water passage. Further, reference numeral 7 represents a strong solution spray pipe, reference numeral 8 represents a solution spray pipe of the low-temperature generator GL, and reference numeral 9 represents a refrigerant liquid spray pipe. Furthermore, reference numerals 11 through 16 represent solution passages, and reference numerals 18 through 21 represent refrigerant passages. Reference numeral 23 represents vertical heat transfer tubes, reference numeral 24 represents a gas-liquid separation chamber, and reference numeral 25 represents a solution supply chamber.

As shown in FIGS. 1A and 2A, in the present invention, the absorber A, the evaporator E, the low-temperature generator GL, and the condenser C are housed in a single rectangular shell. The absorber A is disposed in the lower part of the shell, and the evaporator E is disposed in the upper part of the shell and located in an obliquely upward direction of the absorber A. The condenser C is disposed above the absorber A, and the low-temperature generator GL is disposed above the condenser C. The low pressure side of the absorber A and the evaporator E, and the high pressure side of the low-temperature generator GL and the condenser C are separated by an obliquely extending partition wall 48, and the passage 1 is defined above the partition wall 48 to allow refrigerant vapor to flow from the low-temperature generator GL to the condenser C and the passage 2 is defined below the partition wall 48 to allow refrigerant vapor to flow from the evaporator E to the absorber A.

Further, the high-temperature generator GH and the exhaust heat recovery generator GR which utilize the high-temperature exhaust gas 5 as a heat source, and the solution heat exchangers XH and XL are provided discretely from the shell. The absorber A and the low-temperature generator GL in the shell, the high-temperature generator GH, and the exhaust heat recovery generator GR are connected to each other by the solution passages 11 through 16, and the refrigerant passages 20 and 21. A vertical heat transfer tube bank comprising the vertical heat transfer tubes 23 for allowing the high-temperature exhaust gas 5 therearound is provided in the high-temperature generator GH and the exhaust heat recovery generator GR, respectively. The gas-liquid separation chamber 24 is provided above the vertical heat transfer tube bank, and the solution supply chamber is provided below the vertical heat transfer tube bank.

Next, the absorption chiller-heater shown in FIG. 1A will be described in detail. FIG. 1A shows an example of a branch flow in which weak solution from the absorber A passes through the side to be heated of the low-temperature heat exchanger XL and is then branched from the passage 11, and a part of the solution is introduced into the high-temperature generator GH and the remaining solution is introduced into the low-temperature generator GL.

In a cooling operation of the absorption chiller-heater shown in FIG. 1A, the weak solution which has absorbed refrigerant is supplied by the solution pump SP from the absorber A to the side to be heated of the low-temperature heat exchanger XL through the passage 11, and then passes through the low-temperature heat exchanger XL and is branched at the branch point 10. Then, a part of the weak solution passes through the side to be heated of the high-temperature heat exchanger XH, and is led to the high-temperature generator GH through the passage 11. In the high-temperature generator GH, the weak solution is heated by the high-temperature exhaust gas 5 discharged from an external gas turbine or the like and serving as a heat source to generate refrigerant and is thus concentrated. Then, the concentrated strong solution passes through the passage 12 and is introduced into the high-temperature heat exchanger XH. After heat exchange is performed in the high-temperature heat exchanger XH, the strong solution joins the solution flowing through the passage 14 extending from the exhaust heat recovery generator GR.

On the other hand, the remaining weak solution branched at the branch point 10 passes through the passage 16 and is introduced into the low-temperature generator GL. The weak solution introduced into the low-temperature generator GL is heated by the refrigerant vapor supplied from the high-temperature generator GH and is concentrated in the low-temperature generator GL, and is then introduced into the exhaust heat recovery generator GR through the passage 13. Thereafter, in the exhaust heat recovery generator GR, the solution is heated by the high-temperature exhaust gas which has been used as a heat source in the high-temperature generator GH, and is concentrated. The concentrated strong solution passes through the passage 14 and joins the strong solution supplied from the high-temperature generator GH and flowing through the passage 12. The combined solution passes through the heating side of the low-temperature heat exchanger XL, and is then introduced through the passage 15 into the absorber A. On the other hand, the refrigerant vapor generated in the exhaust heat recovery generator GR passes through the passage 21, and is then introduced into the heat transfer tube bank of the low-temperature generator GL.

The absorption solution sprayed in the low-temperature generator GL is weak solution, and the concentration of the absorption solution in the low-temperature generator GL is low, and hence the condensation temperature of the refrigerant vapor supplied from the high-temperature generator GH can be lowered and the thermal efficiency of the high-temperature generator GH which utilizes the high-temperature exhaust gas can be increased.

The refrigerant vapor generated in the high-temperature generator GH passes through the refrigerant passage 20, and is utilized as a heat source of the low-temperature generator GL and condensed, and is then introduced into the condenser C. In the condenser C, the refrigerant vapor supplied from the low-temperature generator GL through the passage 1 is cooled by cooling water and is condensed, and then the condensed refrigerant is supplied together with the above condensed liquid through the passage 18 to the evaporator E. In the evaporator E, the refrigerant is circulated through the passage 19 by the refrigerant pump RP and is evaporated, whereby cold water of the load side is deprived of heat of evaporation for thereby being cooled, and the cooled cold water is utilized for air cooling. The evaporated refrigerant is absorbed by the strong solution in the absorber A to become weak solution, and the weak solution is circulated by the solution pump SP.

Figure 1B:
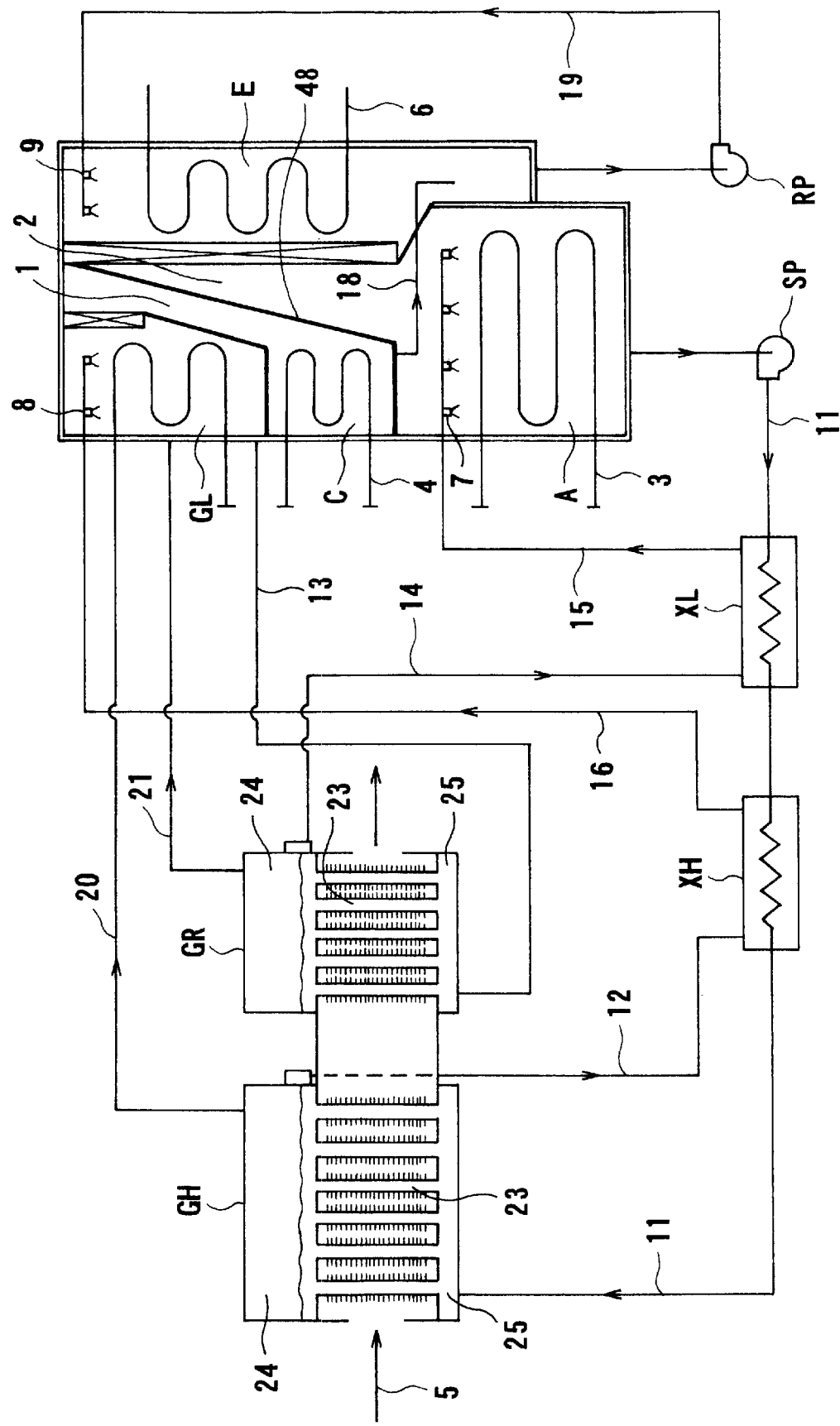
FIG. 1B is a schematic circuit diagram of an absorption chiller-heater according to a modified embodiment of FIG. 1A.

FIG. 1B shows a modified embodiment of FIG. 1A. In the embodiment shown in FIG. 1B, in the high-temperature generator GH and the exhaust heat recovery generator GR, the high-temperature exhaust gas and the solution flow in a parallel current flow. However, in the embodiment shown in FIG. 1A, in the high-temperature generator GH and the exhaust heat recovery generator GR, the high-temperature exhaust gas and the solution flow in a countercurrent flow, and hence utilization efficiency of heat of the high-temperature exhaust gas is further increased compared with the embodiment shown in FIG. 1B.

In a cooling operation of the absorption chiller heater shown in FIG. 1B, the weak solution which has absorbed refrigerant is supplied by the solution pump SP from the absorber A through the passage 11, the side to be heated of the low-temperature heat exchanger XL, the side to be heated of the high-temperature heat exchanger XH to the high-temperature generator GH. In the high-temperature generator GH, the weak solution is heated by the high-temperature exhaust gas 5 serving as a heat source to generate refrigerant and is concentrated, and the strong solution flows through the passage 12 into the high-temperature heat exchanger XH in which heat exchange is carried out, and is then introduced into the low-temperature generator GL through the passage 16. The solution introduced into the low-temperature generator GL is heated by the refrigerant vapor supplied from the high-temperature generator GH and is concentrated in the low-temperature generator GL, and is then introduced into the exhaust heat recovery generator GR through the passage 13. Thereafter, in the exhaust heat recovery generator GR, the solution is heated by the high-temperature exhaust gas which has been used as a heat source in the high-temperature generator GH, and is concentrated. The strong solution passes through the passage 14 and the heating side of the low-temperature heat exchanger XL, and is then introduced through the passage 15 into the absorber A. On the other hand, the refrigerant vapor generated in the exhaust heat recovery generator GR passes through the passage 21, and is then introduced into a heat transfer tube bank of the low-temperature generator GL.

The refrigerant gas generated in the high-temperature generator GH passes through the refrigerant passage 20, and is utilized as a heat source of the low-temperature generator GL and then introduced into the condenser C and cooled by cooling water. In the condenser C, the refrigerant gas supplied from the low-temperature generator GL through the passage 1 is cooled by cooling water and is condensed. Then, the condensed refrigerant is supplied through the passage 18 to the evaporator E. In the evaporator E, the refrigerant is circulated through the passage 19 by the refrigerant pump RP and is evaporated, whereby cold water of the load side is deprived of heat of evaporation for thereby being cooled, and the cooled cold water is utilized for air cooling. The evaporated refrigerant is absorbed by the strong solution in the absorber A to become weak solution, and the weak solution is circulated by the solution pump SP.

In the embodiment shown in FIG. 2A, the exhaust heat recovery heat exchanger XA for heating the solution to be introduced into the high-temperature generator GH is provided downstream of the high-temperature generator GH in the flow path of the high-temperature exhaust gas, and the exhaust heat recovery heat exchanger XB for heating the solution to be introduced into the high-temperature heat exchanger XH is provided downstream of the exhaust heat recovery generator GR in the flow path of the high-temperature exhaust gas. With this arrangement, the utilization efficiency of heat possessed by the high-temperature exhaust gas 5 is further increased compared with the embodiment shown in FIG. 1A.

The exhaust heat recovery heat exchangers XA and XB preferably comprise horizontal heat transfer tubes so that even if vapor is generated, the generated vapor can be easily discharged therefrom. One of the exhaust heat recovery heat exchangers XA and XB may be omitted.

Figure 2B:
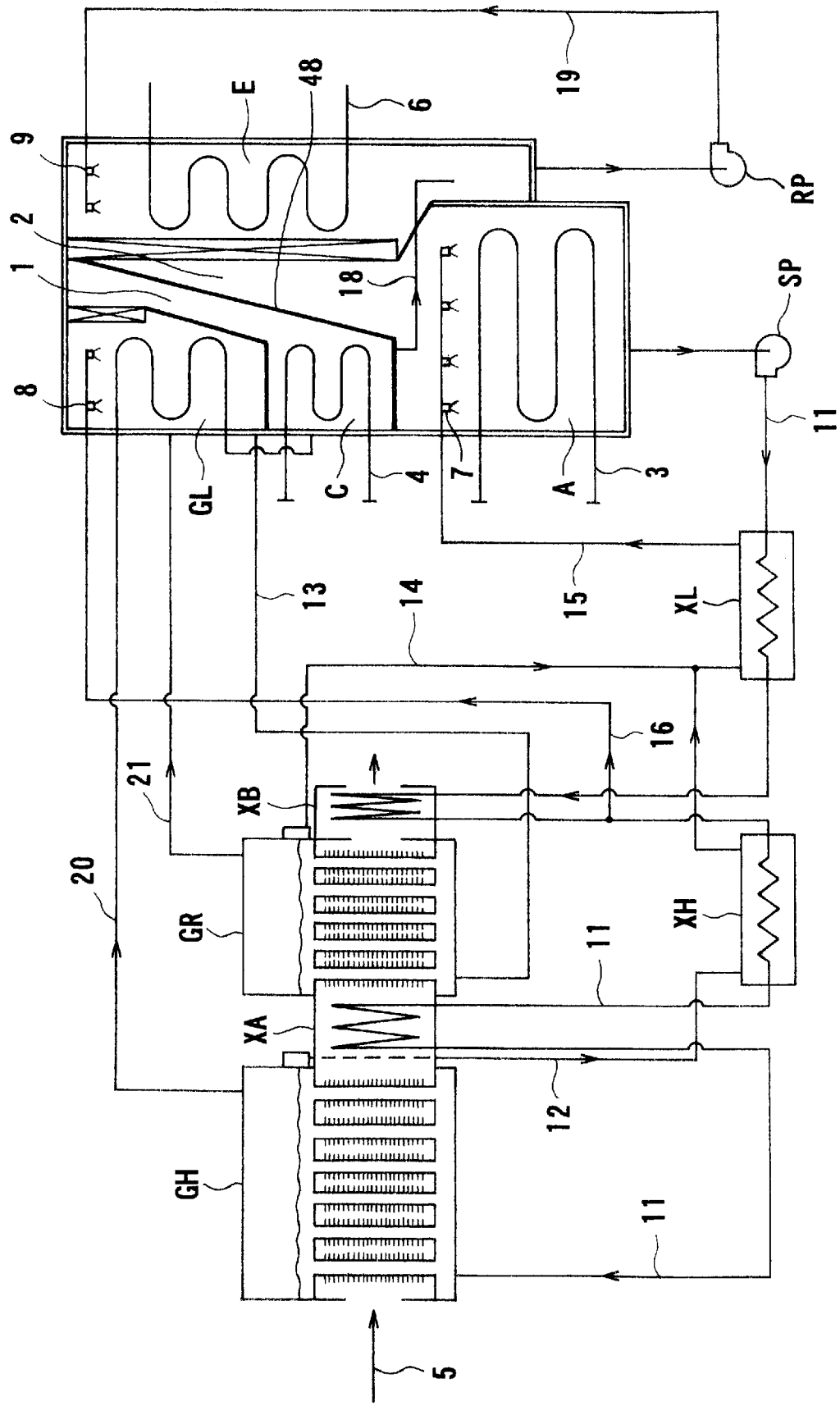
FIG. 2B is a schematic circuit diagram of an absorption chiller-heater according to a modified embodiment of FIG. 2A.

FIG. 2B shows a modified embodiment of FIG. 2A. In the embodiment shown in FIG. 2B, in the high-temperature generator GH and the exhaust heat recovery generator GR, the high-temperature exhaust gas and the solution flow in a parallel current flow. However, in the embodiment shown in FIG. 2A, in the high-temperature generator GH and the exhaust heat recovery generator GR, the high-temperature exhaust gas and the solution flow in a countercurrent flow, and hence utilization efficiency of heat of the high-temperature exhaust gas is further increased compared with the embodiment shown in FIG. 2B.

Heat transfer tubes used for vertical heat transfer tubes and horizontal heat transfer tubes according to the present invention are selected from smooth tubes, low finned tubes, middle finned tubes and high finned tubes according to a temperature level of the exhaust gas. In the case of the exhaust gas discharged from the gas turbine or the like, in many cases, finned tubes are used.

Figure 3A:
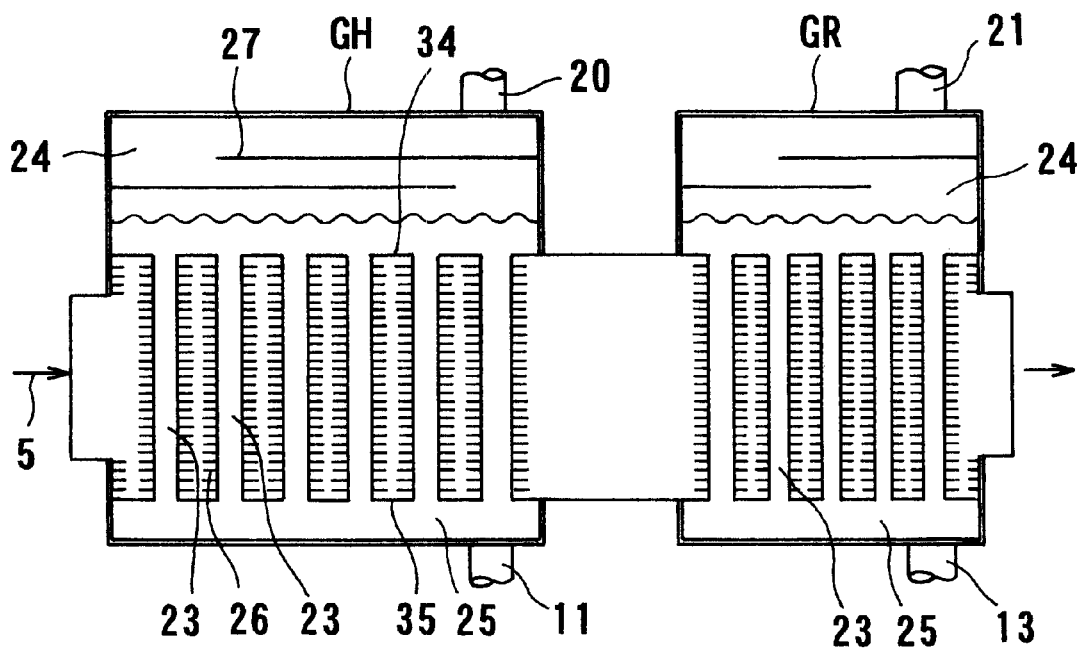
FIGS. 3A and 3B are enlarged views showing a generator used in the absorption chiller-heater according to an embodiment of a first aspect of the present invention.
Figure 3B:
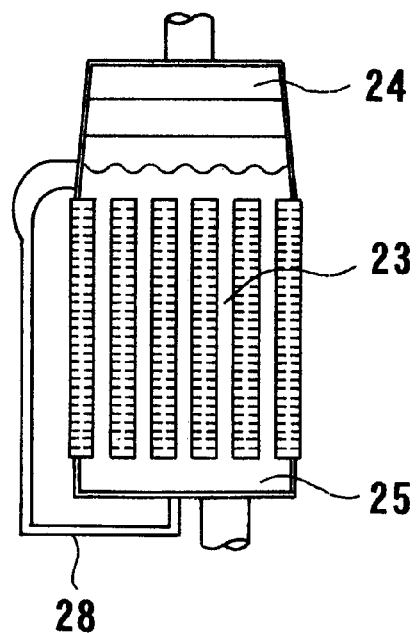

FIGS. 3A and 3B, and FIGS. 4A through 4C show a high-temperature generator and an exhaust heat recovery generator which are used in the absorption chiller-heater shown in FIGS. 1A and 1B, and 2A and 2B. FIG. 3A is a cross-sectional view taken along a flow direction of an exhaust gas, and FIG. 3B is a cross-sectional view taken along a direction perpendicular to the flow direction of the exhaust gas. As shown in FIGS. 3A and 3B, separators 27 are provided in the gas-liquid separation chamber 24, and fins 26 are provided on each of the vertical heat transfer tubes 23 over the entire height of the vertical heat transfer tube. Further, a plurality of downcomers 28 for leading liquid in the gas-liquid separation chamber 24 above the vertical heat transfer tubes 23 to the solution supply chamber 25 below the vertical heat transfer tubes 23 are disposed at plural locations in a longitudinal direction of the respective generators. In each of the generators shown in FIGS. 3A and 3B, the tube plates for the vertical heat transfer tubes 23 are provided at the upper and lower portions of the generator, and flat plates for defining an exhaust gas path are provided at the sides of the generator. Specifically, the exhaust gas path having a rectangular cross section is defined by the upper tube plate 34, the lower tube plate 35, and the right and left sides comprising the flat plates. The vertical heat transfer tubes 23 have upper ends which are connected to the upper tube plate 34, and lower ends which are connected to the lower tube plate 35. The gas-liquid separation chamber 24 is defined above the upper tube plate 34 so as to cover openings of the vertical heat transfer tubes 23, and the solution supply chamber 25 is defined below the lower tube plate 35 so as to cover openings of the vertical heat transfer tubes 23. The side of the generator comprising the flat plate is simpler in structure than a liquid-cooled wall comprising a double wall having solution therebetween. In the case of a direct fired generator, a high-temperature exhaust gas is generated, and hence a liquid-cooled wall is desirable. However, if the exhaust gas has a temperature of about 300 to 400° C. or lower, the side of the generator may comprise a simple flat plate and heat insulating material. The tube plate and flat plate may be separately provided in the high-temperature generator GH and the exhaust heat recovery generator GR, or may be integrally provided in the high-temperature generator GH and the exhaust heat recovery generator GR.

Figure 4A:
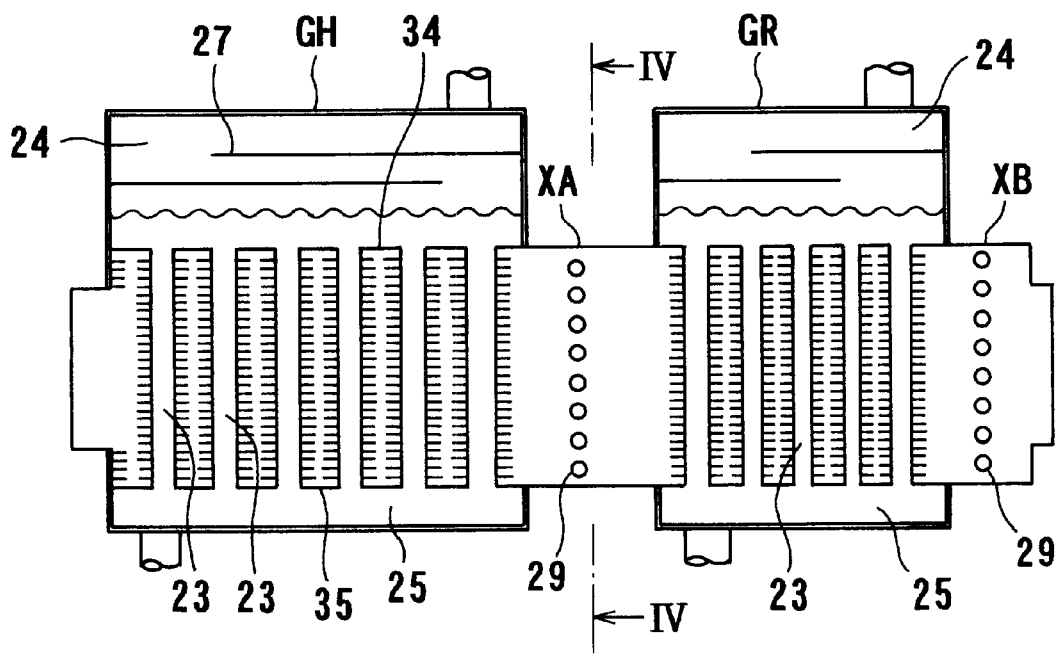
FIGS. 4A, 4B and 4C are enlarged views showing a generator used in the absorption chiller-heater according to another embodiment of the first aspect of the present invention.
Figure 4B:
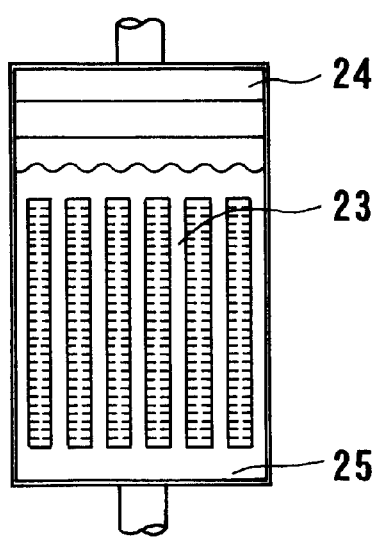
Figure 4C:
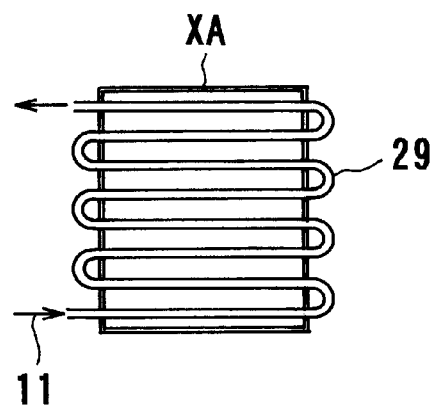

FIGS. 4A, 4B and 4C show another embodiment of the high-temperature generator and the exhaust heat recovery generator. The embodiment shown in FIGS. 4A, 4B and 4C is different from the embodiment shown in FIGS. 3A, 3B and 3C in that a solution heat exchanger XA is horizontally provided between the high-temperature generator GH and the exhaust heat recovery generator GR in the exhaust gas path, and a solution heat exchanger XB is horizontally provided downstream of the exhaust heat recovery generator GR in the exhaust gas path.

FIG. 4A is a cross-sectional view taken along a flow direction of an exhaust gas, FIG. 4B is a cross-sectional view taken along a direction perpendicular to the flow direction of the exhaust gas, and FIG. 4C is a view as viewed from line IV—IV. Like or corresponding parts in the embodiment shown in FIGS. 4A, 4B and 4C are denoted by the same reference numerals as those in the embodiment shown in FIGS. 3A and 3B. In FIGS. 4A, 4B and 4C, the sides of the generator comprise a liquid-cooled wall, and the heat exchangers XA and XB comprise a solution heat exchanger having horizontal finned tubes 29.

Figure 5:
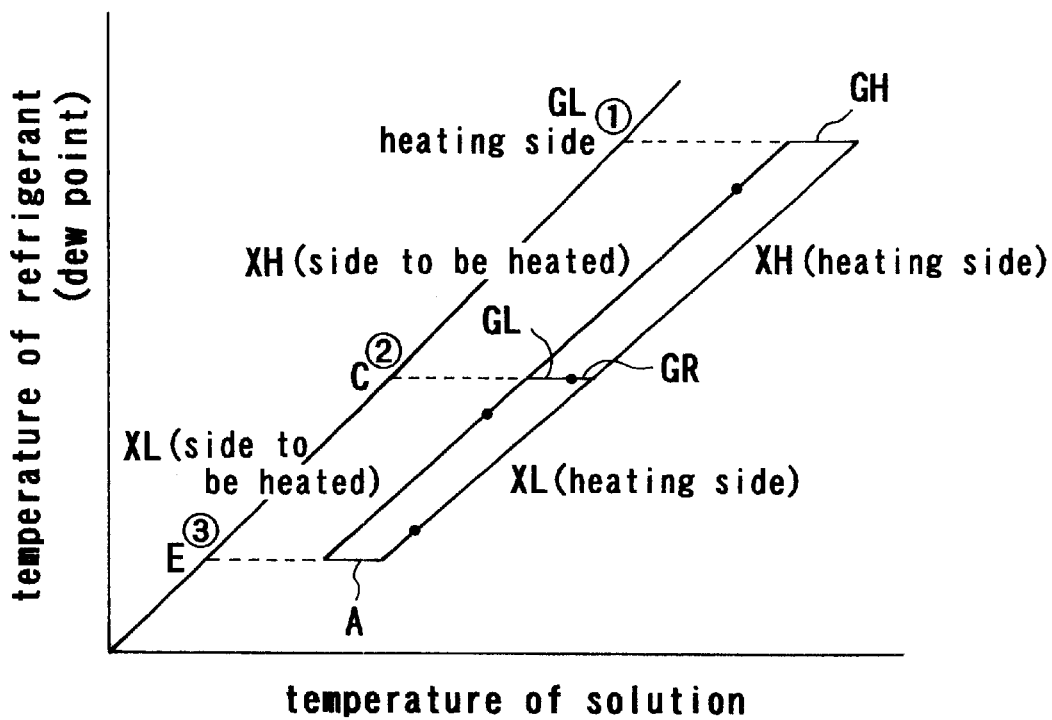
FIG. 5 is an absorption refrigeration cycle diagram of the absorption chiller-heater shown in FIG. 1A.
Figure 6:
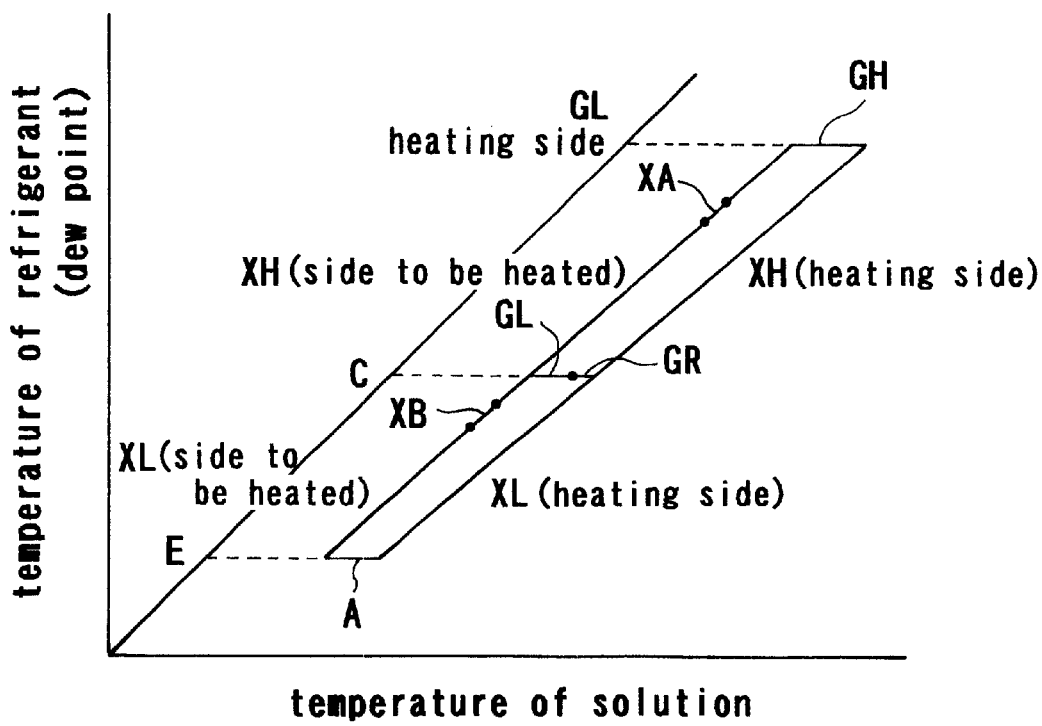
FIG. 6 is an absorption refrigeration cycle diagram of the absorption chiller-heater shown in FIG. 2A.

FIGS. 5 and 6 are absorption refrigeration cycle diagrams of the absorption chiller-heater. In FIGS. 5 and 6, the horizontal axis represents the temperature of solution, and the vertical axis represents the temperature of refrigerant (saturation temperature of refrigerant vapor). In FIGS. 5 and 6, the cycles are illustrated on the Dühring Diagram. FIG. 5 shows an absorption refrigeration cycle in the absorption chiller-heater shown in FIG. 1A, and FIG. 6 shows an absorption refrigeration cycle in the absorption chiller-heater shown in FIG. 2A.

In the embodiment shown in FIG. 5, the solution is supplied from the absorber A to the side to be heated of the low-temperature heat exchanger XL, and then passes through the low-temperature heat exchanger XL and is branched at the branch point 10. A part of the solution branched at the branch point 10 is introduced into the low-temperature generator GL. The remaining solution branched at the branch point 10 passes through the side to be heated of the high-temperature heat exchanger XH, and is introduced into the high-temperature generator GH. In the high-temperature generator GH, the solution is heated by the high-temperature exhaust gas, and hence the solution is concentrated while refrigerant vapor ① is generated. The generated refrigerant vapor ① is introduced into the heating side of the low-temperature generator GL to heat the solution in the side to be heated of the low-temperature generator GL, and thus becomes condensed liquid and is led to the condenser C. The solution discharged from the high-temperature generator GH is supplied to the heating side of the high-temperature heat exchanger XH to supply heat to weak solution, and thus the temperature of the solution is lowered. The solution led to the low-temperature generator GL is heated by the refrigerant vapor ① supplied from the high-temperature generator GH, and is thus concentrated while refrigerant vapor ② is generated. The strong solution is then introduced into the exhaust heat recovery generator GR where the strong solution is heated by the exhaust gas which has passed through the high-temperature generator GH. Thus, the strong solution is concentrated while refrigerant vapor ② is generated in the exhaust heat recovery GR. The concentrated strong solution joins the strong solution discharged from the high-temperature heat exchanger XH, and the combined strong solution is introduced into the heating side of the low-temperature heat exchanger XL to supply heat to the weak solution. Thus, the combined strong solution lowers its temperature, and is returned to the absorber A. In the absorber A, the strong solution absorbs refrigerant vapor ③ supplied from the evaporator E to become weak solution.

In the embodiment shown in FIG. 6, the temperature of the solution is increased by the exhaust heat recovery heat exchanger XB after the solution passes through the side to be heated of the low-temperature heat exchanger XL. Further, the temperature of the solution is increased by the exhaust heat recovery heat exchanger XA after the solution passes through the side to be heated of the high-temperature heat exchanger XH. Other operations of the embodiment shown in FIG. 6 are the same as those of the embodiment shown in FIG. 5.

The flow of the solution is not limited to the embodiments shown in FIGS. 1A and 2A. The weak solution from the absorber may be introduced in parallel into the high-temperature generator and the exhaust heat recovery generator. Further, the solution introduced into the low-temperature generator may be weak solution as described above, or strong solution concentrated in the high-temperature generator. The structure shown in FIGS. 1A and 1B, and 2A and 2B can deal with various absorption refrigeration cycle flow.

According to the present invention, because the high-temperature generator and the exhaust heat recovery generator which have the above structure and utilize a high-temperature exhaust gas as a heat source are disposed in series, the generators which can utilize a high-temperature exhaust gas effectively by a simple apparatus structure can be constructed. Thus, by using such generators, the absorption chiller-heater which is driven by the exhaust gas and has high heat exchanger effectiveness can be constructed.

Next, a generator for use in an absorption chiller-heater according to an embodiment of a second aspect of the present invention will be described with reference to FIGS. 7A, 7B and 7C, and FIGS. 8A and 8B.

According to the present invention, a vertical heat transfer tube bank is provided between an upper tube plate and a lower tube plate, and a plurality of vertical downcomers are provided between the upper tube plate and the lower tube plate. Specifically, heat insulating material is wound around the outer surface of the vertical heat transfer tube to change the function of the heat transfer tube to the function of the downcomer. Alternatively, a tube is inserted into the vertical heat transfer tube, and the interior of the inserted tube is used as a downcomer. In this case, it is desirable to provide a baffle plate for ensuring a solution path so that vapor generated outside the downcomer does not stir the solution to be introduced into the downcomer. Further, a separator having a semicylindrical shape should be provided at the upper part of the inserted tube to separate ascending gas-liquid two-phase flow and descending solution from each other.

Figure 7A:
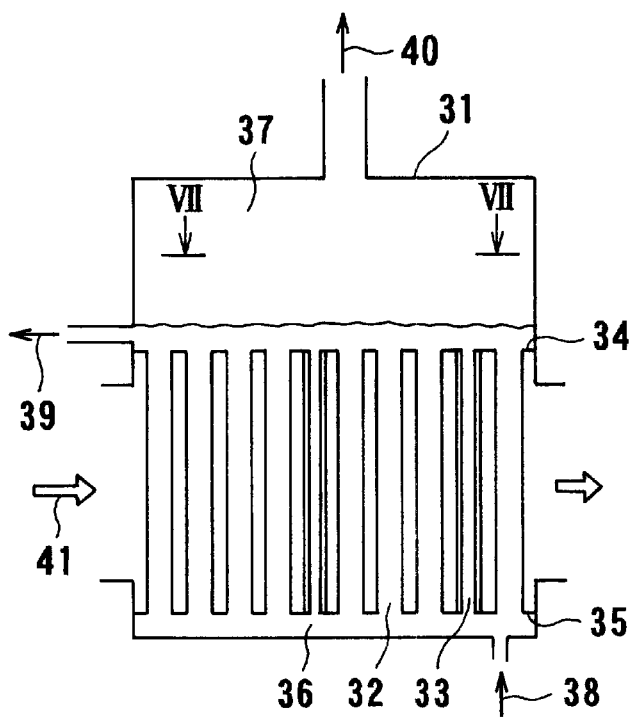
FIGS. 7A, 7B and 7C are enlarged views showing a generator for use in the absorption chiller-heater according to an embodiment of a second aspect of the present invention.
Figure 7B:
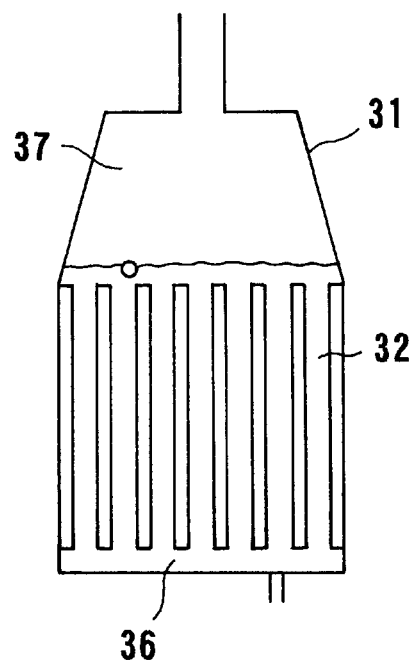
Figure 7C:
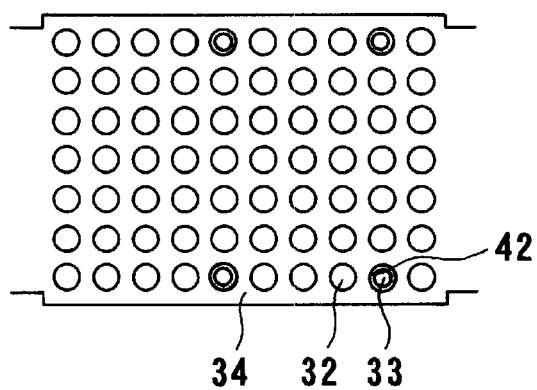

FIGS. 7A, 7B and 7C are enlarged views showing a generator for use in the absorption chiller-heater according to an embodiment of the present invention, and FIG. 7A is a cross-sectional view taken along a flow direction of an exhaust gas, FIG. 7B is a cross-sectional view taken along a direction perpendicular to the flow direction of the exhaust gas, and FIG. 7C is a view as viewed from line VII—VII of FIG. 7A.

In FIGS. 7A, 7B and 7C, reference numeral 31 represents a generator, reference numeral 32 represents vertical heat transfer tubes, reference numeral 33 represents a downcomer, reference numeral 34 represents an upper tube plate, and reference numeral 35 represents a lower tube plate. Further, reference numeral 36 represents a solution supply chamber, reference numeral 37 represents a gas-liquid separation chamber, reference numeral 38 represents absorption solution (weak solution), and reference numeral 39 represents absorption solution (strong solution). Furthermore, reference numeral 40 represents refrigerant vapor, reference numeral 41 represents an exhaust gas (gaseous fluid), and reference numeral 42 represents heat insulating material.

In the generator 31 shown in FIGS. 7A, 7B and 7C, a vertical heat transfer tube bank comprising the vertical heat transfer tubes 32, and the downcomers 33 are provided between the upper tube plate 34 and the lower tube plate 35, the gas-liquid separation chamber 37 is provided above the vertical heat transfer tube bank so as to cover opening portions of the vertical heat transfer tube bank, and the solution supply chamber 36 is provided below the vertical heat transfer tube bank so as to cover opening portions of the vertical heat transfer tube bank. The sides of the generator comprise flat plates for defining an exhaust gas path which allows the exhaust gas 41 to pass therethrough. The absorption solution 38 passes through the vertical heat transfer tubes 32, and the gaseous fluid (exhaust gas) 41 serving as a heat source flows outside the vertical heat transfer tubes 32.

With this arrangement, the generator is simpler in structure than the conventional generator whose sides comprise a liquid-cooled wall (double wall having solution therebetween). In the case of a direct fired generator, a high-temperature exhaust gas is generated, and hence a liquid-cooled wall is desirable. However, if the exhaust gas has a temperature of about 300 to 400° C. or lower, a simple flat plate may be employed.

Next, operation of the generator shown in FIGS. 7A, 7B and 7C will be described. The absorption solution 38 in the vertical heat transfer tubes 32 is heated by the exhaust gas 41 outside the tubes and is boiled to form gas-liquid two-phase flow, and is then blown into the gas-liquid separation chamber 37. The gas-liquid mixture is separated into the refrigerant vapor 40 and the absorption solution. The absorption solution 38 is supplied from the solution supply chamber 36 to the lower portions of the vertical heat transfer tubes 32. A part of the absorption solution in the gas-liquid separation chamber 37 passes through the downcomers 33, and is returned to the solution supply chamber 36 and circulated as the absorption solution 38.

The downcomer 33 is provided in the vertical heat transfer tube 32, and hence the downcomer 33 is heated by the gaseous fluid (exhaust gas) 41 serving as a heat source. However, the solution in the downcomer 33 is prevented from being heated as much as possible by the heat insulating material 42 outside the downcomer, thus becoming in a liquid phase condition or a condition containing a small amount of vapor. The absorption solution 38 in the downcomer 33 has larger apparent density than the solution of two-phase condition in the vertical heat transfer tube 32, and hence forms a descending flow. That is, because apparent density of the solution in the downcomer 33 is larger than that of the solution in the vertical heat transfer tube 32, a descending flow of the solution is formed in the downcomer and an ascending flow of the solution is formed in the vertical heat transfer tube. The present invention is applicable to the conventional generator whose sides comprise a liquid-cooled wall (double wall with solution therebetween). For example, the downcomer may be provided in the vertical heat transfer tube bank.

Figure 8A:
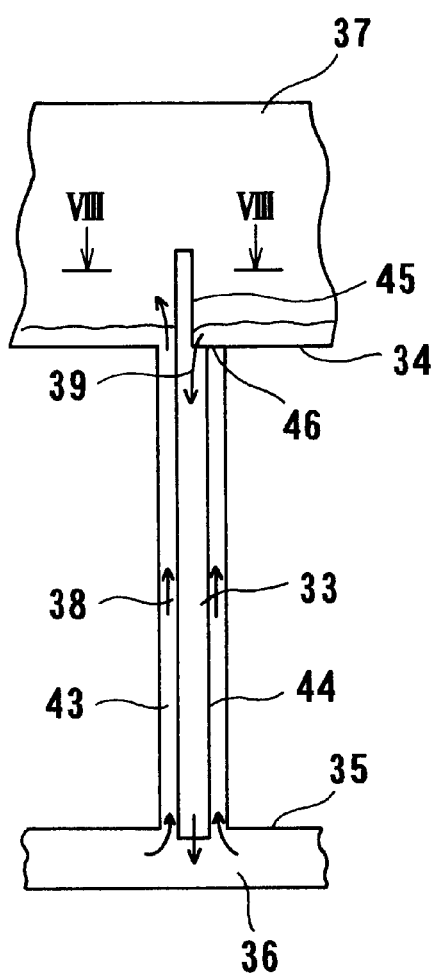
FIGS. 8A and 8B are enlarged views showing a generator for use in the absorption chiller-heater according to another embodiment of the second aspect of the present invention.
Figure 8B:
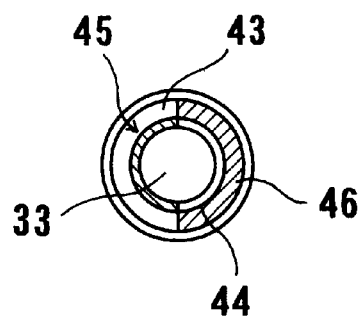

FIGS. 8A and 8B are enlarged views showing a generator for use in the absorption chiller-heater according to another embodiment of the present invention, and FIG. 8A is a front sectional view and FIG. 8B is a view as viewed from line VIII—VIII of FIG. 8A.

In FIGS. 8A and 8B, reference numeral 43 represents a clearance of a double tube, reference numeral 44 represents an inner tube, reference numeral 45 represents a separator, and reference numeral 46 represents a baffle plate. Other structure in the embodiment shown in FIGS. 8A and 8B is the same as that in the embodiment shown in FIGS. 7A, 7B and 7C. In FIGS. 8A and 8B, the downcomer 33 comprising the inner tube 44 of the double tube is provided in the vertical heat transfer tube 32. The absorption solution 38 in the clearance 43 of the double tube is heated by the gaseous fluid (exhaust gas) 41 serving as a heat source and flowing outside the double tube to generate vapor. The absorption solution 38 in the inner tube 44 is heated by the absorption solution 38 in the clearance 43 of the double tube, and hence a heating degree of the absorption solution in the inner tube 44 is lower than that of the absorption solution heated directly by the gaseous fluid 41 serving as a heating source. Therefore, in this case also, the same effect as the case shown in FIGS. 7A through 7C where heat insulation is performed can be obtained and a descending flow of the absorption solution is formed in the downcomer 33 comprising the inner tube 44.

In the case where the vertical heat transfer tube has fins, the outer tube of the double tube is constructed to have no fins so that the difference of the quantity of heat to be transferred is large, and hence the difference of apparent density can be enlarged.

Because vapor is generated in the clearance 43, a releasing location of vapor is provided, and this releasing location and the inflow location of liquid at the upper portion of the double tube are separated from each other. Specifically, a half-cut section of the inner tube serves as the separator 45, and the baffle plate 46 located at the clearance serves as a connecting passage for leading liquid to the inner tube.

The present invention having the above structure is applicable to the generator having no liquid-cooled wall. Further, in the present invention, a downcomer is not provided outside the outer wall of the generator to make the structure of the generator simple. Therefore, the generator for use in the absorption chiller-heater which can reduce the amount of absorption solution to be reserved and has high efficiency can be constructed.

Next, a generator for use in an absorption chiller-heater according to embodiments of a third aspect of the present invention will be described in detail with reference to FIGS. 9A, 9B and 9c through 12.

According to the present invention, in a generator having a vertical heat transfer tube bank in which absorption solution passes through vertical heat transfer tubes, and gaseous fluid serving as a heat source flows outside the vertical heat transfer tubes, a gas-liquid separation chamber is provided above the vertical heat transfer tube bank so as to cover opening portions of the vertical heat transfer tube bank, at least one baffle plate is provided in the gas-liquid separation chamber to divide the vertical heat transfer tube bank into a plurality of blocks in a flow direction of the gaseous fluid, a solution supply chamber is provided below the vertical heat transfer tube bank so as to cover opening portions of the vertical heat transfer tube bank, and at least one baffle plate is provided in the solution supply chamber so as to divide the vertical heat transfer tube bank into a plurality of blocks in a flow direction of the gaseous fluid. Further, a solution inlet is provided at the upper block or the lower block located at the outlet side of the gaseous fluid, and a solution outlet is provided at the upper block located at the inlet side of the gaseous fluid.

In the generator according to the present invention, the positional relationship of the inlet and outlet of the solution is arranged such that the solution flows as a whole in a countercurrent flow to the gaseous fluid, the flow of the solution is regulated by the baffle plate, and the solution is not mixed as a whole in the flow direction.

Figure 9A:
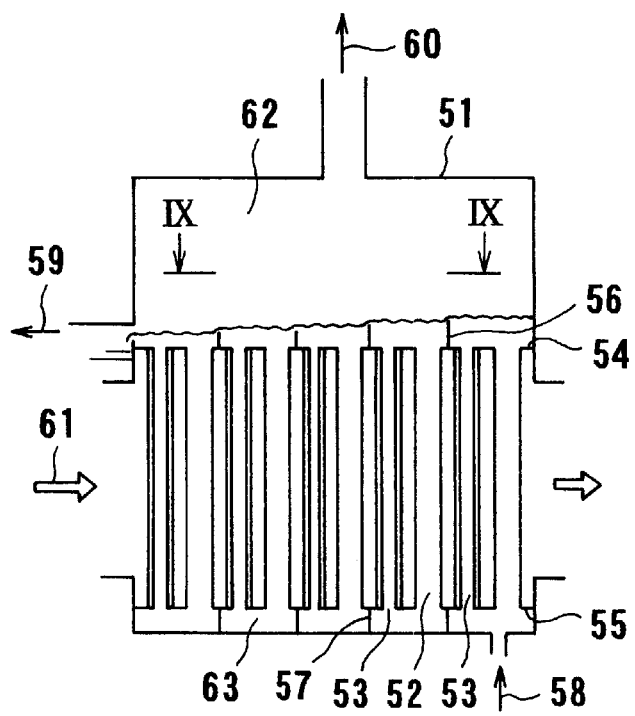
FIGS. 9A, 9B and 9C are enlarged views showing a generator for use in the absorption chiller-heater according to an embodiment of a third aspect of the present invention.
Figure 9B:
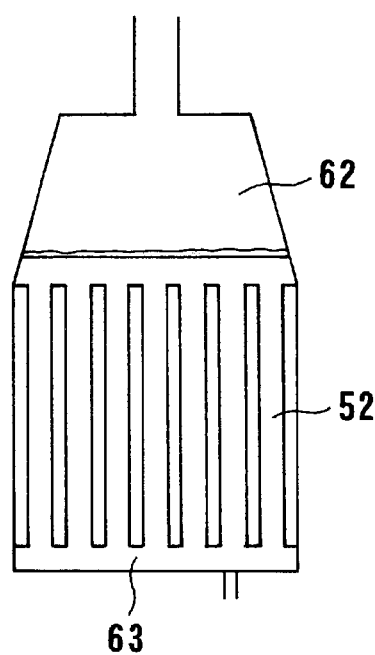
Figure 9C:
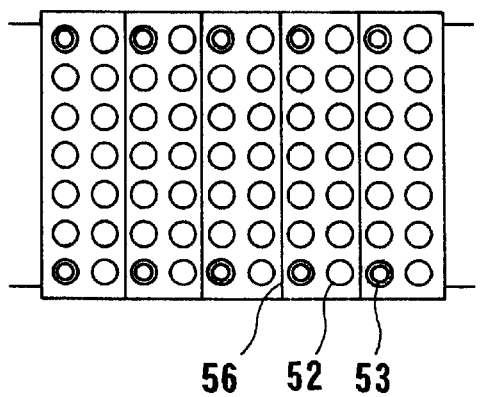

FIGS. 9A, 9B and 9C are enlarged views showing a generator for use in an absorption chiller-heater according to an embodiment of the present invention, and FIG. 9A is a cross-sectional view taken along a flow direction of an exhaust gas, and FIG. 9B is a cross-sectional view taken along a direction perpendicular to the flow direction of the exhaust gas, and FIG. 9C is a view as viewed from line IX—IX of FIG. 9A.

Figure 10:
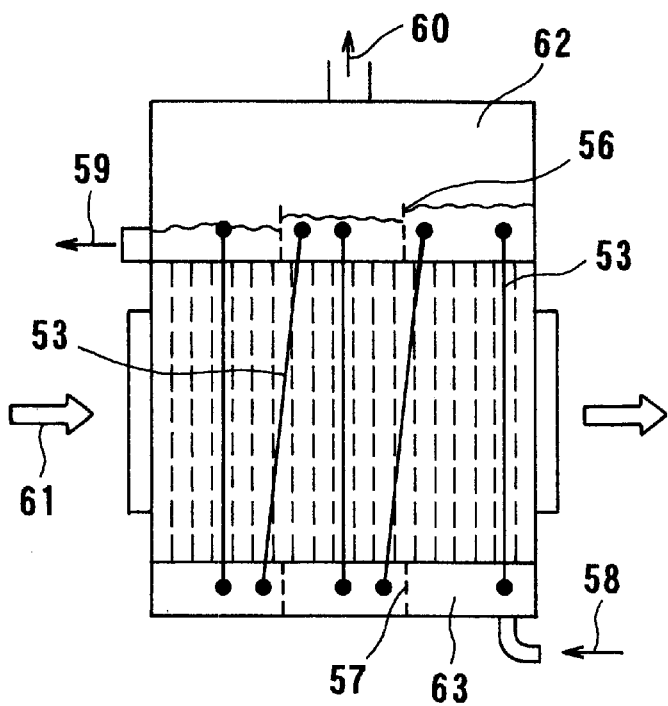
FIG. 10 is a schematic view of a generator for use in the absorption chiller-heater according to another embodiment of the third aspect in the present invention.
Figure 11:
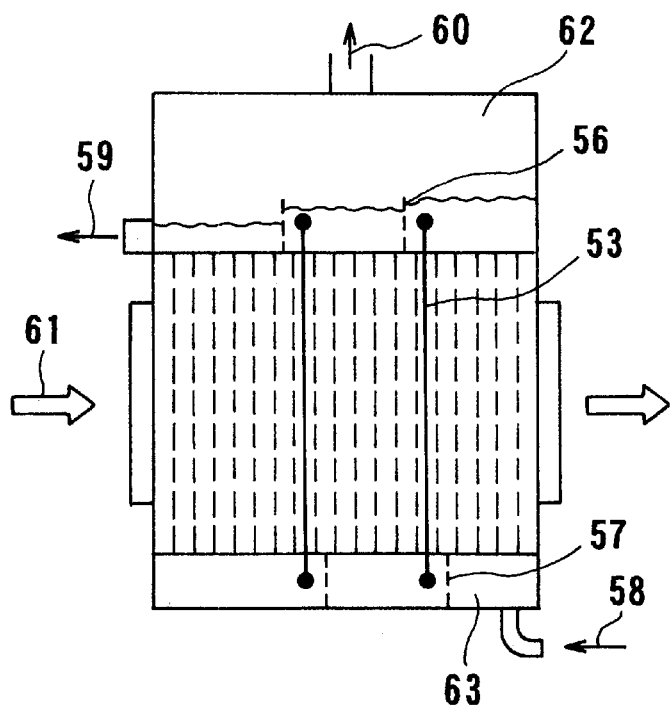
FIG. 11 is a schematic view of a generator for use in the absorption chiller-heater according to still another embodiment of the third aspect in the present invention.
Figure 12:
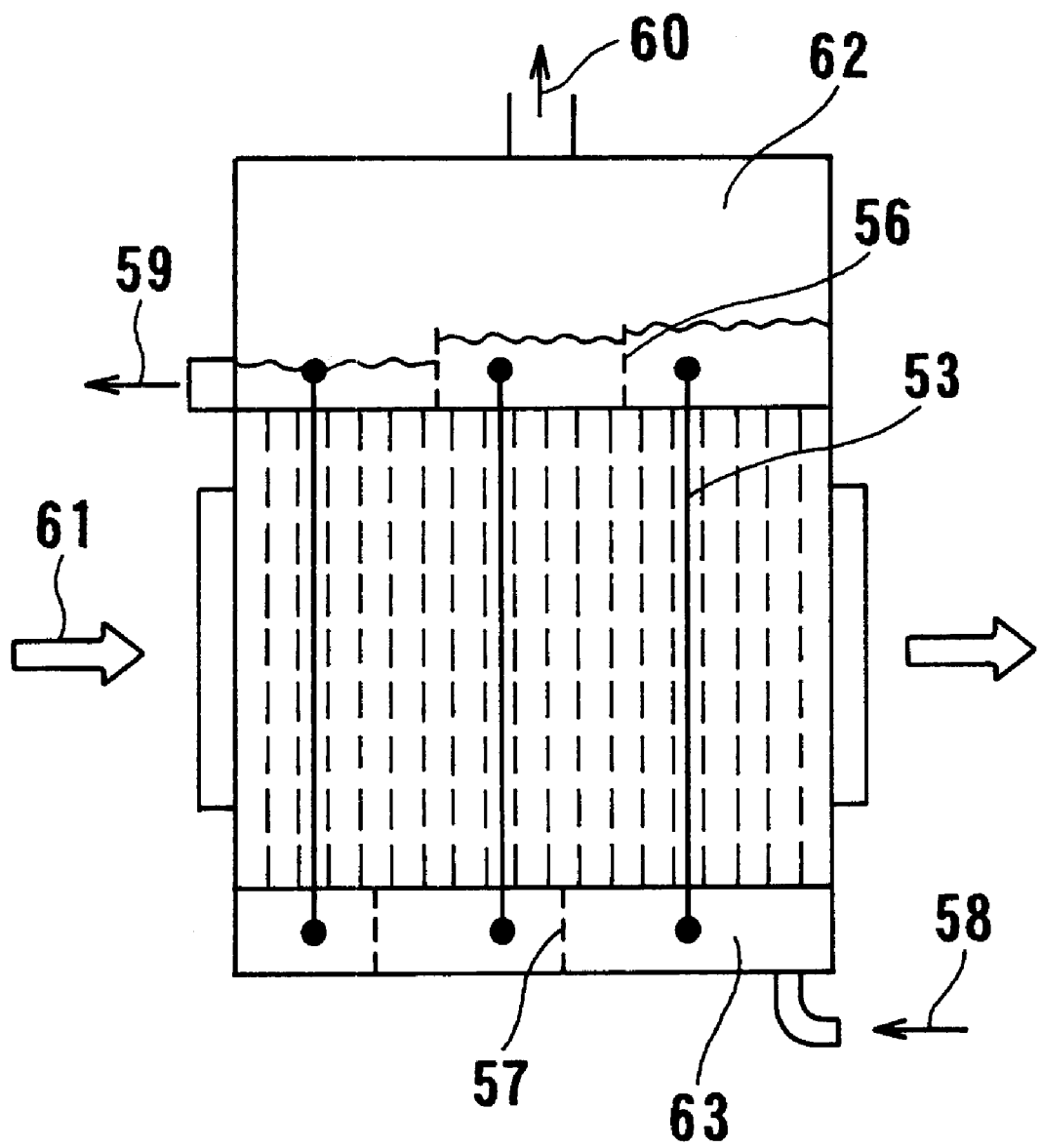
FIG. 12 is a schematic view of a generator for use in the absorption chiller-heater according to still another embodiment of the third aspect in the present invention.

FIGS. 10 through 12 are schematic views of a generator for use in an absorption chiller-heater according to other embodiments of the present invention.

In FIGS. 9A, 9B and 9C through FIG. 12, reference numeral 51 represents a generator, reference numeral 52 represents vertical heat transfer tubes, reference numeral 53 represents a downcomer, reference numeral 54 represents an upper tube plate, and reference numeral 55 represents a lower tube plate. Further, reference numeral 56 represents an upper baffle plate, reference numeral 57 represents a lower baffle plate, reference numeral 58 represents absorption solution (weak solution), and reference numeral 59 represents absorption solution (strong solution). Furthermore, reference numeral 60 represents refrigerant vapor, reference numeral 61 represents an exhaust gas (gaseous fluid) serving as a heat source, reference numeral 62 represents a gas-liquid separation chamber, and reference numeral 63 represents a solution supply chamber.

In the generator shown in FIGS. 9A, 9B and 9C, a vertical heat transfer tube bank comprising the vertical heat transfer tubes 52 is provided between the upper tube plate 54 and the lower tube plate 55, the gas-liquid separation chamber 62 is provided above the vertical heat transfer tube bank so as to cover opening portions of the vertical heat transfer tube bank, and the solution supply chamber 63 is provided below the vertical heat transfer tube bank so as to cover opening portions of the vertical heat transfer tube bank. The baffle plates 56 and 57 are provided so as to divide the vertical heat transfer tube bank into a plurality of blocks in a flow direction of the exhaust gas. That is, a plurality of the baffle plates 57 are provided to divide the solution supply chamber 63 into a plurality of small chambers in a flow direction of the exhaust gas. Each of the baffle plates 57 extends from the lower tube plate 55 to the bottom wall of the solution supply chamber 63 to divide the solution supply chamber 63 into a plurality of small chambers. Thus, in the embodiment shown in FIGS. 9A through 9C, the solution supply chamber 63 is divided into five small chambers. Further, a plurality of the baffle plates 56 are provided in the gas-liquid separation chamber 62. Each of the baffle plates 56 extends from the upper tube plate 54, and has a certain height so that the gas-liquid separation chamber 62 is not divided above the upper end of the baffle plate 56 but is divided below the upper end of the baffle plate 56. Thus, in the embodiment shown in FIGS. 9A through 9C, five spaces for storing the solution therein are formed above the upper tube plate 54 in the gas-liquid separation chamber 62. The upper baffle plate 56 and the lower baffle plate 57 form a pair or a counterpart.

With the above arrangement, the vertical heat transfer tube bank is functionally divided into five blocks by the upper baffle plates 56 and the lower baffle plates 57 so that the solution can flow separately in the respective blocks each comprising the vertical heat transfer tubes 52. The absorption solution 58 passes through the vertical heat transfer tubes 52, and the gaseous fluid 61 serving as a heat source flows outside the vertical heat transfer tubes 52.

Next, operation of the generator shown in FIGS. 9A, 9B and 9C will be described. The absorption solution 58 in the vertical heat transfer tubes 52 is heated by the exhaust gas 61 outside the tubes and is boiled to form gas-liquid two-phase flow, and is then blown into the gas-liquid separation chamber 62. The gas-liquid mixture is separated into the refrigerant vapor 60 and the absorption solution. The absorption solution 58 is supplied from the solution supply chamber 63 to the lower portions of the vertical heat transfer tubes 52. A part of the absorption solution in the gas-liquid separation chamber 62 passes through the downcomers 53, and is returned to the solution supply chamber 63 and circulated as the absorption solution. The remaining solution overflows the baffle plate 56 in the gas-liquid separation chamber 62 and flows into the subsequent block.

In the subsequent block, the solution is supplied from the gas-liquid separation chamber 62 to the solution supply chamber 63 through the downcomers 53. On the other hand, an ascending flow of the solution is generated in the vertical heat transfer tubes 52, the solution is circulated between the upper chamber and the lower chamber, and a part of the solution overflows into the following block.

More specifically, the absorption solution supplied to the first small chamber (first block) in the solution supply chamber 63 located at the right side end in FIG. 9A flows into the first block of the vertical heat transfer tube bank located at the right side end in FIG. 9A. A part of solution in the first space (first block) in the gas-liquid separation chamber 62 located at the right side end in FIG. 9A passes through the downcomers 53, and is returned to the first small chamber in the solution supply chamber 63 and circulated as the absorption solution. The remaining solution overflows the baffle plate 56 located at the right side end in FIG. 9A and flows into the second space (second block).

Next, the solution is supplied from the second space of the gas-liquid separation chamber 62 to the second small chamber (second block) in the solution supply chamber 63 through the downcomers 53. On the other hand, an ascending flow of the solution is generated in the heat transfer tubes 52 at the second block, the solution is circulated between the second space (second block) and the second small chamber (second block), and a part of the solution overflows into the third space (third block). The same flow of the solution is created in the subsequent blocks.

In the embodiment shown in FIGS. 9A, 9B and 9C, the vertical heat transfer tube bank is divided into five blocks. Even if the vertical heat transfer tube bank is divided into more than five blocks, the same flow of the solution is created.

The solution which has overflowed the baffle plate 56 in the preceding space (preceding block) in the gas-liquid separation chamber 62 enters the final space (final block), and the solution is supplied from the final space in the gas-liquid separation chamber 62 to the final small chamber (final block) in the solution supply chamber 63 through the downcomers 53. On the other hand, an ascending flow of the solution is generated in the vertical heat transfer tubes 52, the solution is circulated between the upper chamber and the lower chamber, and a part of the solution becomes strong solution and is discharged from the outlet of the generator 51.

The concentration of the absorption solution 58 is gradually increased from the inlet block to the outlet block, and while the boiling temperature of the absorption solution 58 is gradually increased, the absorption solution 58 flows toward the outlet block. The absorption solution 58 and the gaseous fluid serving as a heat source flow in a countercurrent flow.

In the embodiment shown in FIGS. 9A, 9B and 9C, the exhaust gas is utilized as a heat source. Although not shown in the drawing, the present invention is applicable to the case where the flat-flamed burner is provided. Further, the present invention is applicable to a vertical heat transfer tube section in the generator which incorporates a cylindrical-flamed burner.

In the embodiment shown in FIGS. 9A, 9B and 9C, the downcomers are provided in the vertical heat transfer tube bank. However, as shown in FIGS. 10 through 12, the downcomers may be provided outside the shell.

The absorption chiller-heater according to the present invention can be applied to a single-effect absorption chiller-heater or a double-effect absorption chiller-heater or a single-effect and double-effect absorption chiller-heater which incorporates a generator connected thereto.

The baffle plates in the solution supply chamber may be provided so as to partition the adjacent blocks. However, a hole may be formed in the baffle plate so as to allow the solution to flow between the adjacent two blocks.

The baffle plate in the gas-liquid separation chamber employs an overflowing arrangement in the embodiment. However, a notch may be formed in the lower part of the baffle plate to allow a part of the solution to pass therethrough.

FIG. 10 is a schematic view of a generator for use in an absorption chiller-heater according to another embodiment of the present invention. In the embodiment shown in FIGS. 9A, 9B and 9C, the solution overflows the baffle plate 56 in the gas-liquid separation chamber 62 and flows into the subsequent block. However, as shown in FIG. 10, the solution may be supplied to the subsequent block by the downcomer 53. That is, the solution in the first block of the gas-liquid separation chamber 62 may be supplied to the second block of the solution supply chamber 63.

FIG. 11 is a schematic view of a generator for use in an absorption chiller-heater according to another embodiment of the present invention. In the embodiment shown in FIG. 11, the absorption solution 58 (weak solution) is supplied to the small chamber in the solution supply chamber 63 in the generator, and the absorption solution 58 in the vertical heat transfer tubes is heated by the exhaust gas 61 outside the tubes and is boiled to form gas-liquid two-phase flow, and is then blown into the gas-liquid separation chamber 62. The gas-liquid mixture is separated into the refrigerant vapor 60 and the absorption solution.

The absorption solution in the space (block) in the gas-liquid separation chamber 62 is supplied to the subsequent small chamber (subsequent block) in the solution supply chamber 63 through the downcomer 53. Further, the whole solution may be supplied to the subsequent block through the downcomer 53, or may be supplied to the subsequent block by overflowing the baffle plate 56 in the gas-liquid separation chamber 62. The same holds true for the following blocks.

A part of the solution of the second block in the solution supply chamber 63 flows upwardly to the first block in the gas-liquid separation chamber 62 through the vertical heat transfer tubes 52, and the remaining solution flows upwardly to the second block in the gas-liquid separation chamber 62 through the vertical heat transfer tubes 52.

The solution flows as a whole from the first block to the second block. However, a part of the solution is returned from the second block to the first block, and circulated up and down.

The absorption solution of the second block in the gas-liquid separation chamber 62 is supplied to the third block of the solution supply chamber 63 through the downcomer 53.

A part of the solution of the third block in the solution supply chamber 63 flows upwardly to the second block in the gas-liquid separation chamber 62 through the vertical heat transfer tubes 52, and the remaining solution flows upwardly to the third block in the gas-liquid separation chamber 62 through the vertical heat transfer tubes 52.

A part of the solution of the third block in the gas-liquid separation chamber 62 is returned to the solution supply chamber 63 through the downcomer 53, and the remaining solution is discharged from the generator 51.

FIG. 12 is a schematic view of a generator for use in an absorption chiller-heater according to still another embodiment of the present invention. In the embodiment shown in FIG. 12, the absorption solution 58 (weak solution) is supplied to the solution supply chamber 63 in the generator, the absorption solution 58 in the vertical heat transfer tubes 52 is heated by the exhaust gas 61 outside the tubes and is boiled to form gas-liquid two-phase flow, most part of the solution is blown into the block in the gas-liquid separation chamber 62 in the same order and the remaining solution is blown into the subsequent block in the gas-liquid separation chamber 62. The gas-liquid mixture is separated into the refrigerant vapor 60 and the absorption solution.

The absorption solution of the gas-liquid separation chamber 62 is supplied to the block in the solution supply chamber 63 in the same order through the downcomer 53, a part of the solution moves to the subsequent block in the gas-liquid separation chamber 62 while it is circulated. The solution is supplied together with vapor from the second block of the solution supply chamber 63 to the third block of the gas-liquid separation chamber 62 through the vertical heat transfer tubes 52, a part of the solution is returned to the third block of the solution supply chamber 63 through the downcomer 53 and is circulated, and the remaining solution is discharged from the generator.

According to the present invention having the above structure, the gaseous fluid serving as a heat source and the absorption solution flow as a whole in a countercurrent flow, and the gaseous fluid and the absorption solution are rarely mixed in a flow direction, thus making it possible to utilize the heat source gas effectively.

Next, a generator for use in an absorption chiller-heater according to an embodiment of the present invention will be described with reference to FIGS. 13A, 13B and 13C, and FIGS. 14A and 14B.

The present invention is applied to an absorption chiller-heater which is driven by an exhaust gas having a temperature of 300 to 400° C. or lower. In such absorption chiller-heater, the amount of solution to be reserved can be extremely small. Thus, the tube plates for the vertical transfer tubes are provided at the upper and lower portions of the generator, and the flat plates for defining an exhaust gas path are provided at the sides of the generator.

Further, in order to ensure the circulation of the solution up and down and increase heat transfer in the heat transfer tube section, the upper chamber and the lower chamber may be connected by downcomers. Further, since a temperature of the exhaust gas is low, a baffle plate for regulating the flow of the solution may be provided in the upper and lower chambers so that the exhaust gas and the solution flow as a whole in a countercurrent flow.

Figures 13A, 13B:
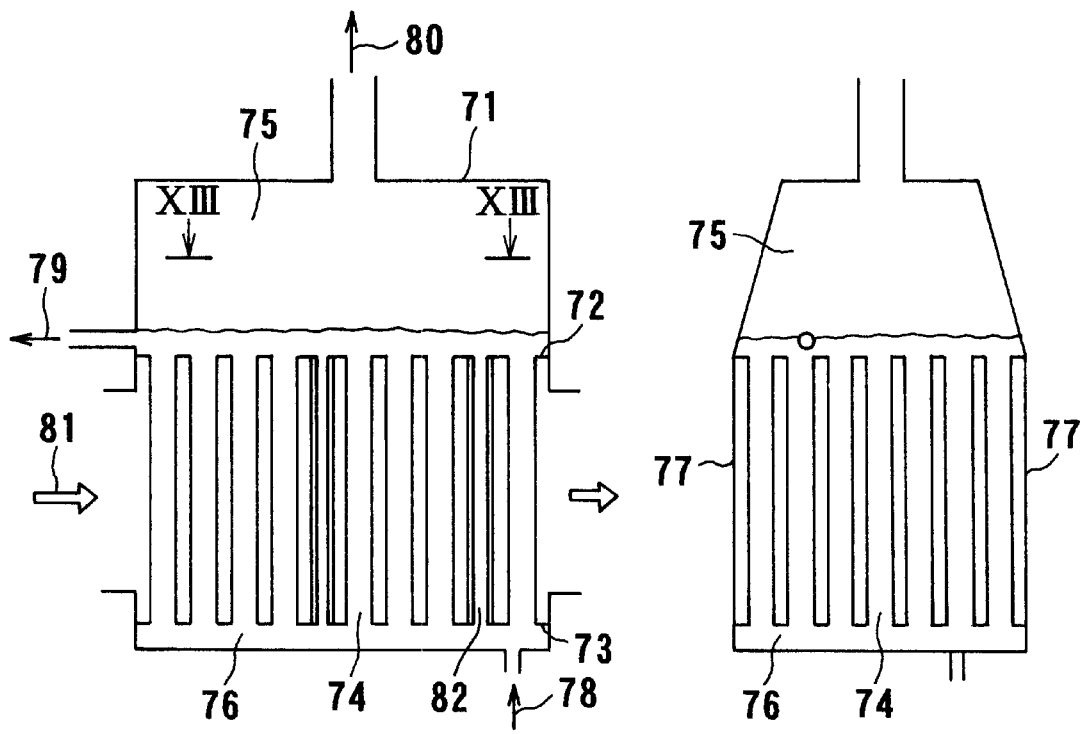
FIGS. 13A, 13B and 13C are enlarged views showing a generator for use in the absorption chiller-heater according to an embodiment of a fourth aspect of the present invention.
Figure 13C:
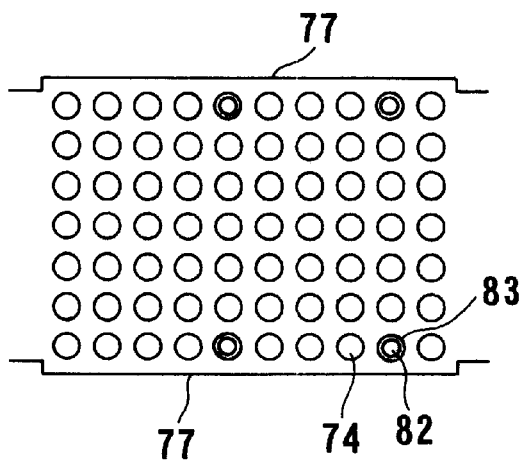

FIGS. 13A, 13B and 13C are enlarged views showing a generator for use in an absorption chiller-heater according to an embodiment of the present invention, and FIG. 13A is a cross-sectional view taken along a flow direction of an exhaust gas, FIG. 13B is a cross-sectional view taken along a direction perpendicular to the flow direction of the exhaust gas, and FIG. 13C is a view as viewed from line XIII—XIII of FIG. 13A.

Figure 14A:
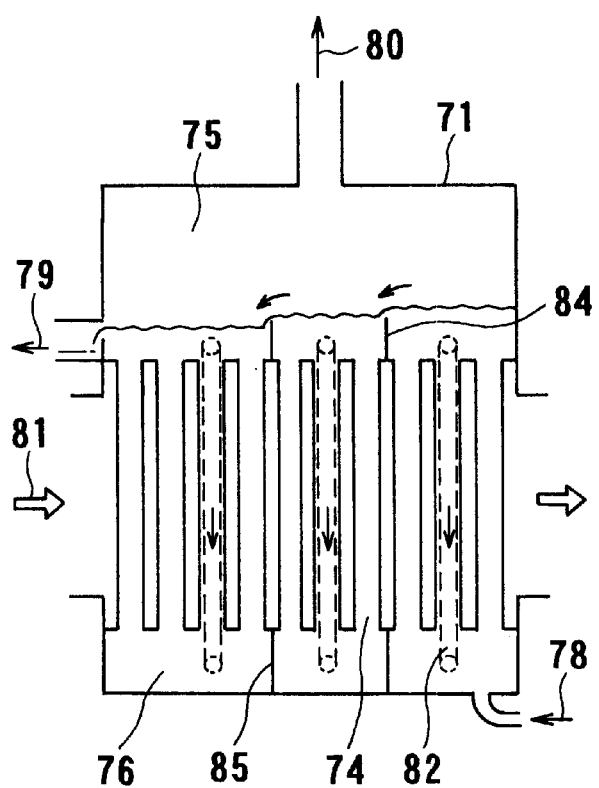
FIGS. 14A and 14B are enlarged views showing a generator for use in the absorption chiller-heater according to another embodiment of the fourth aspect of the present invention.
Figure 14B:
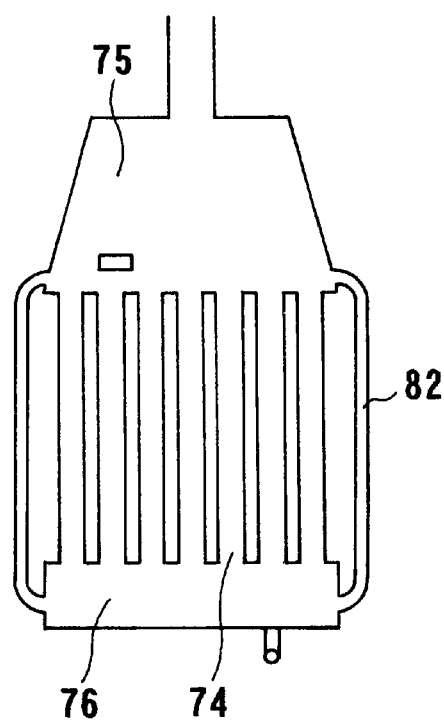

FIGS. 14A and 14B are enlarged views showing a generator for use in the absorption chiller-heater according to the embodiment of the fourth aspect of the present invention, and FIG. 14A is a cross-sectional view taken along a flow direction of an exhaust gas, and FIG. 14B is a cross-sectional view taken along a direction perpendicular to the flow direction of the exhaust gas.

In FIGS. 13A, 13B and 13C and FIGS. 14A and 14B, reference numeral 71 represents a generator, reference numeral 72 represents an upper tube plate, reference numeral 73 represents a lower tube plate, reference numeral 74 represents vertical heat transfer tubes, reference numeral 75 represents an upper chamber (gas-liquid separation chamber), and reference numeral 76 represents a lower chamber (solution supply chamber). Further, reference numeral 77 represents a flat plate which connects the upper and lower chambers, reference numeral 78 represents absorption solution (weak solution), reference numeral 79 represents absorption solution (strong solution), reference numeral 80 represents refrigerant vapor, and reference numeral 81 represents an exhaust gas (heat source). Furthermore, reference numeral 82 represents a downcomer, reference numeral 83 represents heat insulating material, reference numeral 84 represents a baffle plate of the upper chamber, and reference numeral 85 represents a baffle plate of the lower chamber.

In the generator shown in FIGS. 13A, 13B and 13C, a vertical heat transfer tube bank comprising the vertical heat transfer tubes 74 is provided between the upper tube plate 72 and the lower tube plate 73, the upper chamber (gas-liquid separation chamber) 75 is provided above the vertical heat transfer tube bank so as to cover opening portions of the vertical heat transfer tube bank, and the lower chamber (solution supply chamber) 76 is provided below the vertical heat transfer tube bank so as to cover opening portions of the vertical heat transfer tube bank. Further, the upper chamber 75 and the lower chamber 76 are connected by the flat plates 77, an exhaust gas path is formed so as to enclose the vertical heat transfer tube bank by the upper and lower tube plates 72 and 73, and the flat plates 77.

The absorption solution 78 passes through the vertical heat transfer tubes 74, and the gaseous fluid (exhaust gas) 81 serving as a heat source flows outside the vertical heat transfer tubes 74. Further, the downcomers 82 are provided in a part of the vertical heat transfer tube bank.

Next, operation of the generator shown in FIGS. 13A, 13B and 13C will be described. The absorption solution 78 in the vertical heat transfer tubes 74 is heated by the exhaust gas 81 outside the tubes and is boiled to form gas-liquid two-phase flow, and is then blown into the upper chamber (gas-liquid separation chamber) 75. The gas-liquid mixture is separated into the refrigerant vapor 80 and the absorption solution. The absorption solution is supplied from the solution supply chamber 76 to the lower portions of the vertical heat transfer tubes 74. A part of the absorption solution in the gas-liquid separation chamber 75 passes through the downcomers 82, and is returned to the solution supply chamber 76 and circulated as the absorption solution.

The downcomer 82 is provided in the vertical heat transfer tube 74, and hence the downcomer 82 is heated by the gaseous fluid 81 serving as a heat source. However, the solution in the downcomer 82 is prevented from being heated as much as possible by the heat insulating material 83 outside the downcomer 82, thus becoming in a liquid phase condition or a condition containing a small amount of vapor. The absorption solution 78 in the downcomer 82 has larger apparent density than the solution of two-phase condition in the vertical heat transfer tube 74, and hence forms a descending flow. That is, because apparent density of the solution in downcomer 82 is larger than that of the solution in the vertical heat transfer tube 74, a descending flow of the solution is formed in the downcomer 82 and an ascending flow of the solution is formed in the vertical heat transfer tube 74.

In the embodiment shown in FIGS. 13A, 13B and 13C, the vertical heat transfer tubes are shown in tessellated arrangement or in staggered arrangement.

Further, the vertical heat transfer tube is shown as a smooth tube. However, a part of the vertical heat transfer tubes or the whole of the vertical heat transfer tubes may comprise finned tubes.

In the embodiment shown in FIGS. 13A, 13B and 13C, the downcomers 82 are provided in the vertical heat transfer tube bank. However, as shown in FIGS. 14A and 14B, the downcomers 82 may be provided outside the shell.

Further, as shown in FIGS. 14A and 14B, baffle plates 84 and 85 are provided in the upper chamber 75 and the lower chamber 76, respectively. If the absorption solution 78 and the exhaust gas 81 flow as a whole in a countercurrent flow as shown by arrows, then heat transfer can be effectively performed. Further, the mean temperature difference between the gas and the solution can be large, and the quantity of heat to be transferred can be increased.

According to the present invention, the following advantages may be obtained:

The amount of solution to be reserved can be extremely smaller than the conventional generator whose sides comprise a liquid-cooled wall (double wall with solution therebetween), the structure of the generator can be simple, the generator can be easily manufactured, and inspection of airtightness can be easily performed.

Further, in many cases, an exhaust gas generally has a low pressure of 10 to 200 mmAq, and the differential pressure applied to the side wall is about 0.1 to 2% of the conventional vacuum container. Thus, the required strength of the plate for forming the side wall is extremely small.

The generator according to the second through forth aspects of the present invention may be applied to a single-effect absorption chiller-heater or a double-effect absorption chiller-heater or a single-effect and double-effect absorption chiller-heater shown in FIG. 1A.

Figure 15:
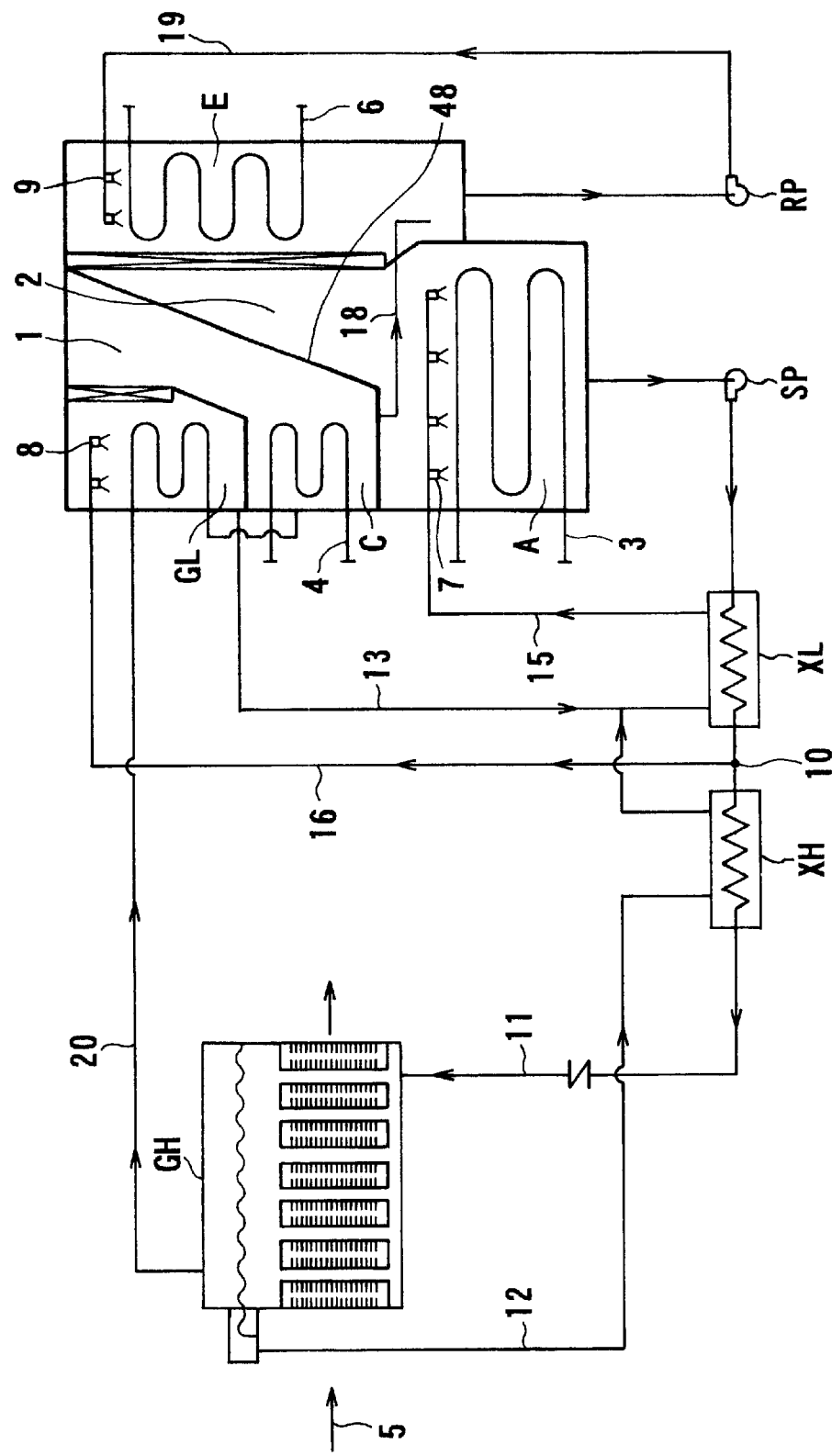
FIG. 15 is a schematic circuit diagram of an absorption chiller-heater which incorporates a generator according to embodiments of the first through fourth aspects of the present invention.

Next, a double-effect absorption chiller-heater which incorporates a generator according to embodiments of the second through fourth aspects of the present invention will be described with reference to FIG. 15. FIG. 15 is a schematic circuit diagram of an absorption chiller-heater according to an embodiment of the present invention. In the absorption chiller-heater shown in FIG. 15, there are provided an absorber A, a low-temperature generator GL, a high-temperature generator GH, a condenser C, an evaporator E, a low-temperature heat exchanger XL, and a high-temperature heat exchanger XH. Further, in the absorption chiller-heater, there are provided a solution pump SP, and a refrigerant pump RP.

In FIG. 15, reference numerals 1 and 2 represent refrigerant vapor passages, reference numerals 3 and 4 represent cooling water circulation passages, reference numeral 5 represents a high-temperature exhaust gas, and reference numeral 6 represents a cold or hot water circulation passage. Further, reference numerals 7, 8 and 9 represent spray pipes, the reference numeral 10 represents a branch point, reference numerals 11 through 16 represent solution passages, and reference numerals 18 through 20 represent refrigerant passages.

Next, operations of the absorption chiller-heater shown in FIG. 15 will be described.

In the cold water producing operation, the solution which has absorbed refrigerant is supplied by the solution pump SP from the absorber A to the side to be heated of the low-temperature heat exchanger XL through the passage 11, and then passes through the low-temperature heat exchanger XL and is branched at the branch point 10. A part of the solution branched at the branch point 10 passes through the passage 16 and is introduced into the low temperature generator GL. The remaining solution passes through the side to be heated of the high-temperature heat exchanger XH, and is led to the high-temperature generator GH through the passage 11. In the high-temperature generator GH, the solution is heated by the exhaust gas 5 discharged from an external gas turbine or the like and serving as a heat source to generate refrigerant and is thus concentrated. Then, the concentrated solution passes through the passage 12 and is introduced into the high-temperature heat exchanger XH. After heat exchange is performed in the high-temperature heat exchanger XH, the solution joins the solution flowing through the passage 13, and the combined solution is introduced into the heating side of the low-temperature heat exchanger XL.

The solution which has been introduced into the low-temperature generator GL through the passage 16 is sprayed from the spray nozzle 8 on the vertical heat transfer tube bank and heated by the refrigerant vapor generated in the high-temperature generator GH and is concentrated. Then, the concentrated solution joins the solution flowing through the passage 13. The combined solution passes through the heating side of the low-temperature heat exchanger XL and the passage 15, and is introduced into the absorber A.

On the other hand, the refrigerant vapor generated in the low-temperature generator GL is introduced into the condenser C. In the condenser C, the refrigerant vapor is condensed by heat exchange with cooling water flowing through the cooling water circulation passage 4.

The refrigerant vapor which has generated in the high-temperature generator GH and served as a heat source of the low-temperature generator GL becomes condensed liquid and enters the condenser C, and is then introduced together with the above condensed refrigerant liquid condensed in the condenser C into the evaporator E.

In the evaporator E, the refrigerant liquid deprives the cold water of heat to achieve a refrigerating effect, and becomes refrigerant vapor. The strong solution passes through the heating side of the low-temperature heat exchanger XL and is returned to the absorber A, and is then sprayed on the heat transfer surface which is being cooled by the cooling water. Then, the sprayed strong solution absorbs the refrigerant vapor supplied from the evaporator E and becomes weak solution.

Although certain preferred embodiments of the present invention have been shown and described in detail, it should be understood that various changes and modifications may be made therein without departing from the scope of the appended claims.

What is claimed is:

1. An absorption chiller-heater comprising:

an absorber;

a low-temperature generator;

an exhaust heat recovery generator;

a high-temperature generator;

a condenser;

an evaporator;

a solution path and a refrigerant path for connecting said absorber, said low-temperature generator, said exhaust heat recovery generator, said high-temperature generator, said condenser, and said evaporator; and an exhaust gas path containing said high temperature generator and said exhaust heat recovery generator for introducing a high-temperature exhaust gas serving as a heat source into said high-temperature generator, and then said exhaust heat recovery generator, said exhaust gas path being substantially straight in a flow direction of said exhaust gas;

wherein said high-temperature generator and said exhaust heat recovery generator comprise a vertical heat transfer tube bank for allowing said high-temperature exhaust gas to flow therethrough, a gas-liquid separation chamber is provided above said vertical heat transfer tube bank so as to cover opening portions of said vertical heat transfer tube bank, a solution supply chamber is provided below said vertical heat transfer tube bank so as to cover opening portions of said vertical heat transfer tube bank, and said high-temperature exhaust gas is led to said vertical heat transfer tube bank of said high-temperature generator, and then to said vertical heat transfer tube bank of said exhaust heat recovery generator.

2. An absorption chiller-heater according to claim 1, wherein said exhaust gas path has a rectangular cross section.

3. An absorption chiller-heater according to claim 1, further comprising at least one of:
   a heat exchanger provided between said high-temperature generator and said exhaust heat recovery generator for recovering heat from said exhaust gas in said exhaust gas path; and
   a heat exchanger provided downstream of said exhaust heat recovery generator for recovering heat from said exhaust gas in said exhaust gas path.

4. An absorption chiller-heater according to claim 3, wherein said at least one of said heat exchangers for recovering heat from said exhaust gas comprises a horizontal heat transfer tube bank provided in said exhaust gas path of said rectangular cross section.

5. An absorption chiller-heater according to claim 1, further comprising a downcomer between said gas-liquid separation chamber and said solution supply chamber in said high-temperature generator and said exhaust heat recovery generator.

6. A generator for use in an absorption chiller-heater, comprising a shell containing:
   an upper tube plate;
   a lower tube plate;
   a vertical heat transfer tube bank provided between said upper tube plate and said lower tube plate, said vertical heat transfer tube bank comprising a plurality of heat transfer tubes for allowing absorption solution to flow therethrough, and means for supplying a gas to said shell for serving as a heat source flowing outside of said heat transfer tubes; and
   a plurality of downcomers provided between said upper tube plate and said lower tube plate for allowing said absorption solution to flow therethrough downwardly.

7. A generator according to claim 6, wherein said downcomer comprises steel at a side of said absorption solution and heat insulating material at a side of said gas.

8. A generator for use in an absorption chiller-heater, comprising:
   an upper tube plate;
   a lower tube plate;
   a vertical heat transfer tube bank provided between said upper tube plate and said lower tube plate, said vertical heat transfer tube bank comprising a plurality of heat transfer tubes for allowing absorption solution to flow therethrough, and a gas serving as a heat source flowing outside of said heat transfer tubes; and
   a plurality of downcomers provided between said upper tube plate and said lower tube plate for allowing said absorption solution to flow therethrough downwardly, wherein said downcomer comprises a double tube having an outer tube and an inner tube, and a baffle plate is provided in the vicinity of said upper tube plate so as to fill up a clearance between said outer tube and said inner tube in a circumferential direction.

9. A generator according to claim 8, wherein said downcomer is arranged such that a part of said inner tube projects upwardly from said upper tube plate, a part of the projecting portion of said inner tube is cut to a predetermined shape, and the cut portion of said inner tube is aligned with said baffle plate in a radial direction of said double tube.

10. A generator for use in an absorption chiller-heater, comprising a shell containing:
   an upper tube plate;
   a lower tube plate;
   a vertical heat transfer tube bank provided between said upper tube plate and said lower tube plate, said vertical heat transfer tube bank comprising a plurality of heat transfer tubes for allowing absorption solution to flow therethrough, and means for supplying a gas to said shell for serving as a heat source flowing outside of said heat transfer tubes;
   a gas-liquid separation chamber provided above said upper tube plate so as to cover opening portions of said vertical heat transfer tube bank;
   a solution supply chamber provided below said lower tube plate so as to cover opening portions of said vertical heat transfer tube bank;
   at least one baffle plate provided in each of said gas-liquid separation chamber and said solution supply chamber for dividing said vertical heat transfer tube bank into a plurality of blocks in a flow direction of said gas;
   an absorption solution inlet for supplying said absorption solution to one of said gas-liquid separation chamber and said solution supply chamber, said absorption solution inlet being provided at an outlet side of said gas; and
   an absorption solution outlet for discharging said absorption solution from said gas-liquid separation chamber, said absorption solution outlet being provided at an inlet side of said gas.

11. A generator according to claim 10, wherein said gas-liquid separation chamber, said solution supply chamber, and said vertical heat transfer tube bank are divided into the same number of blocks by said at least one baffle plate in each of said gas-liquid separation chamber and said solution supply chamber;
   said vertical heat transfer tubes in each block which are open at each block of said gas-liquid separation chamber and each block of said solution supply chamber are the same tubes and the same number; and
   at least one downcomer is provided to connect respective blocks of said gas-liquid separation chamber and said solution supply chamber which are located in the same order from said absorption solution inlet side, and/or to connect a block of said gas-liquid separation chamber and a subsequent block of said solution supply chamber which are located in different order from said absorption solution inlet side.

12. A generator according to claim 10, wherein said gas-liquid separation chamber, said solution supply chamber, and said vertical heat transfer tube bank are divided into the same number of blocks by said at least one baffle plate in each of said gas-liquid separation chamber and said solution supply chamber;

said vertical heat transfer tubes in each block which are open at a block of said gas-liquid separation chamber are open at a block and a subsequent block of said solution supply chamber from said absorption solution inlet side; and at least one downcomer is provided to connect respective blocks of said gas-liquid separation chamber and said solution supply chamber which are located in the same order from said absorption solution inlet side, and/or to connect a block of said gas-liquid separation chamber and a subsequent block of said solution supply chamber which are located in different order from said absorption solution inlet side.

13. A generator according to claim 10, wherein said gas-liquid separation chamber, said solution supply chamber, and said vertical heat transfer tube bank are divided into the same number of blocks by said at least one baffle plate in each of said gas-liquid separation chamber and said solution supply chamber;

said vertical heat transfer tubes in each block which are open at a block of said solution supply chamber are open at a block and a subsequent block of said gas-liquid separation chamber from said absorption solution inlet side; and at least one downcomer is provided to connect respective blocks of said gas-liquid separation chamber and said solution supply chamber which are located in the same order from said absorption solution inlet side, and/or to connect a block of said gas-liquid separation chamber and a subsequent block of said solution supply chamber which are located in different order from said absorption solution inlet side.

14. A generator for use in an absorption chiller-heater, comprising a shell containing:

an upper tube plate;

a lower tube plate;

a vertical heat transfer tube bank provided between said upper tube plate and said lower tube plate, said vertical heat transfer tube bank comprising a plurality of heat transfer tubes for allowing absorption solution to flow therethrough, and means for supplying a gas to said shell for serving as a heat source flowing outside of said heat transfer tubes;

wherein said upper tube plate comprises an integral component, and an upper chamber is provided above said upper tube plate so as to cover said upper tube plate;

said lower tube plate comprises an integral component, and a lower chamber is provided below said lower tube plate so as to cover said lower tube plate;

both sides of said vertical heat transfer tube bank are covered by flat plates which connect said upper chamber and said lower chamber; and said upper tube plate, said lower tube plate and said flat plates define a gas flow path for allowing said gas to flow therethrough.

15. A generator according to claim 14, further comprising a downcomer which connects said upper chamber and said lower chamber.

16. A generator according to claim 14, further comprising a baffle plate provided in said upper chamber and said lower chamber for regulating a flow of said absorption solution so as to form a coutercurrent flow to said gas.

* * * * *

UNITED STATES PATENT AND TRADEMARK OFFICE
CERTIFICATE OF CORRECTION

PATENT NO. : 6,694,772 B2
DATED : February 24, 2004
INVENTOR(S) : Naoyuki Inoue et al.

It is certified that error appears in the above-identified patent and that said Letters Patent is hereby corrected as shown below:

<u>Title page,</u>
Item [30], Foreign Application Priority Data, -- Jan. 30, 2002 (JP) ….. 2002-022088 --.

Signed and Sealed this

Sixth Day of July, 2004

JON W. DUDAS
*Acting Director of the United States Patent and Trademark Office*